US012582277B2

(12) United States Patent
Lv

(10) Patent No.: US 12,582,277 B2
(45) Date of Patent: Mar. 24, 2026

(54) CLEANING DEVICE AND CLEANING MODULE

(71) Applicant: Shenzhen Sichuang Ge'er Technology Co., Ltd., Shenzhen (CN)

(72) Inventor: Yunxian Lv, Jinhua (CN)

(73) Assignee: Shenzhen Sichuang Ge'er Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/020,247

(22) Filed: Jan. 14, 2025

(65) Prior Publication Data

US 2025/0331698 A1 Oct. 30, 2025

(30) Foreign Application Priority Data

Apr. 29, 2024 (CN) ......................... 202420908031.6

(51) Int. Cl.

| | |
|---|---|
| ***A47L 13/50*** | (2006.01) |
| ***A47L 13/254*** | (2006.01) |
| ***B08B 1/12*** | (2024.01) |
| ***B08B 1/20*** | (2024.01) |

(52) U.S. Cl.

CPC ............. *A47L 13/50* (2013.01); *A47L 13/254* (2013.01); *B08B 1/12* (2024.01); *B08B 1/20* (2024.01)

(58) Field of Classification Search

CPC .......... A47L 13/50; A47L 13/51; A47L 13/59; A47L 13/58; A46B 17/06

USPC ........................................ 15/119.1, 260, 264

See application file for complete search history.

(56) References Cited

U.S. PATENT DOCUMENTS

2012/0222226 A1* 9/2012 Chen ....................... A47L 13/58 15/98
2015/0089757 A1* 4/2015 Davidshofer ......... A47L 13/254 15/147.2
2018/0028040 A1* 2/2018 Delangue .................. B08B 1/52
2021/0177233 A1* 6/2021 Petito ...................... A47J 47/18

FOREIGN PATENT DOCUMENTS

CN 111481131 A * 8/2020 ............. A47L 13/59

* cited by examiner

*Primary Examiner* — David S Posigian
*Assistant Examiner* — Tyler James Mcfarland
(74) *Attorney, Agent, or Firm* — Sang Young Han

(57) ABSTRACT

Provided are a cleaning device and a cleaning module. The cleaning device includes a cavity, and a lifting assembly arranged in the cavity. The lifting assembly includes a housing, and a moving assembly. The moving assembly has a first position and a second position relative to the housing, where the second position is higher than the first position. When the moving assembly is at the first position, a panel on the cleaning tool can be connected to the moving assembly, and can rotate relative to the housing for cleaning. When the moving assembly is at the second position, the panel can rotate relative to the cleaning device for dehydration.

14 Claims, 17 Drawing Sheets

CLEANING DEVICE AND CLEANING MODULE

CROSS-REFERENCE TO RELATED APPLICATION

This patent application claims the priority of Chinese Patent Application No. CN202420908031.6 filed on Apr. 29, 2024, the disclosure of which is incorporated by reference herein in its entirety.

TECHNICAL FIELD

The present disclosure belongs to the technical field of cleaning devices, and in particular to a cleaning device, and a cleaning module.

BACKGROUND

Mop is an important tool for household cleaning. To make the mop more convenient to use, the mop is are often equipped with a special cleaning bucket or sink. The mop head can be washed by extending the mop into the cleaning bucket or sink and then rotating the mop head.

However, in the prior art, when washing the mop, it is necessary to wash the mop head with clean water first, then discharge the sewage in the cleaning bucket or sink after cleaning, and finally put the cleaned mop in the cleaning bucket or sink to be pressed up and down to squeeze out the water. The cleaning process is relatively complicated and requires multiple steps, which makes the user inconvenient to operate.

SUMMARY

In view of above situation, it is necessary to provide a cleaning device to simplify the steps for washing the cleaning tool.

An embodiment of the present disclosure provides a cleaning device used to wash a cleaning tool. The cleaning device includes a cavity, and a lifting assembly arranged in the cavity. The cavity can be used to accommodate liquid. The lifting assembly includes a housing, and a moving assembly. The housing is connected to the cavity, and provided with a first accommodating cavity. The moving assembly is at least partially arranged in the first accommodating cavity, and configured to move in a first direction relative to the housing. The moving assembly has a first position and a second position relative to the housing, where the second position is higher than the first position. When the moving assembly is at the first position, a panel on the cleaning tool can be connected to the moving assembly, and the panel can rotate relative to the cleaning device for cleaning. When the moving assembly rises from the first position to the second position, the degree of freedom of the moving assembly in the first direction is limited, and the panel connected to the moving assembly can rotate relative to the cleaning device for dehydration.

In some embodiments of the present disclosure, a first through hole is formed in the housing, and the first through hole runs through an upper wall of the housing in the first direction and communicates with the first accommodating cavity. The moving assembly includes an adjusting rod, and a fixture block. The adjusting rod is at least partially located in the first accommodating cavity, and movably connected to the housing in the first direction, where the top of the adjusting rod is configured to penetrate out from the first through hole. The fixture block is arranged in the first accommodating cavity, and connected to an adjusting rod. The adjusting rod and the fixture block are configured to move in the first direction, and the fixture block is configured to move in a second direction perpendicular to the first direction relative to the adjusting rod. When the moving assembly is at the second position, the fixture block is connected to the housing in a limited manner.

In some embodiments of the present disclosure, the housing is provided with a limit hole, the limit hole is formed in a peripheral wall of the housing and communicates with the first accommodating cavity, and an end portion of the fixture block is in fit with the limit hole; and when the moving assembly is at the second position, the end portion of the fixture block is inserted into the limit hole.

In some embodiments of the present disclosure, an inner side of a sidewall of the housing is provided with a flange which extends from the sidewall of the housing towards an axis of the housing; when the moving assembly is at the second position, the fixture block is located on the flange and connected to the flange.

In some embodiments of the present disclosure, the moving assembly further comprises: a round rod, located in the first accommodating cavity, and configured to move in synchronization with the adjusting rod in the first direction; a special-shaped block, connected to the fixture block and is in adaptive connection with the round rod, wherein the round rod is able to be used to drive the special-shaped block to drive the fixture block to move in the second direction; a connecting rod, wherein one end of the connecting rod is connected to the round rod, the other end of the connecting rod is arranged at the top of the adjusting rod in a penetrating manner, and the connecting rod is configured to drive the round rod to move in the first direction relative to the adjusting rod, or move in synchronization with the adjusting rod; and when the panel is connected to the moving assembly, a trigger block on the panel is pressed against the connecting rod.

In some embodiments of the present disclosure, the special-shaped block is provided with a chute in fit with the round rod; the round rod is partially located in the chute, and configured to be movable in the chute to drive the special-shaped block to move in the second direction.

In some embodiments of the present disclosure, the moving assembly further comprises a first elastic member, which is connected to the adjusting rod and the round rod, and configured to apply an upward thrust to the round rod and the connecting rod.

In some embodiments of the present disclosure, the moving assembly further comprises a circular plate; the circular plate is connected to the round rod, and the circular plate and the round rod are configured to move synchronously in the first direction; the first elastic member is connected to the adjusting rod and the circular plate, and configured to apply an upward thrust to the circular plate, the round rod and the connecting rod.

In some embodiments of the present disclosure, the moving assembly further comprises a second elastic member, which is connected to the special-shaped block and the fixture block, and configured to apply an outward thrust to the fixture block in the second direction.

In some embodiments of the present disclosure, an inner wall of the housing is provided with a first guide groove, the fixture block or the adjusting rod is at least partially located in the first guide groove, and the fixture block or the adjusting rod is able to move in the first direction under the guidance of the first guide groove.

In some embodiments of the present disclosure, the adjusting rod is provided with: a second accommodating cavity, wherein the second accommodating cavity extends in the first direction, and the round rod, part of the connecting rod and part of the special-shaped block are arranged in the second accommodating cavity; and a second guide groove, wherein the second guide groove extend in the second direction and communicates with the second accommodating cavity and the first accommodating cavity, wherein part of the special-shaped block and part of the fixture block are arranged in the second guide groove.

In some embodiments of the present disclosure, the moving assembly further comprises a bearing, the bearing is located above a top wall of the housing and connected to the adjusting rod; when the panel is connected to the moving assembly, the bearing is configured to connect the panel and the adjusting rod.

In some embodiments of the present disclosure, the moving assembly further comprises a connector; the connector is at least partially located above the top wall of the housing, used to connect the adjusting rod and the bearing, and configured to be rotatable relative to the adjusting rod; and when the panel is connected to the moving assembly, the connector is configured to clamp the panel.

In some embodiments of the present disclosure, the cleaning device further comprises a fixed seat; the fixed seat is fixedly arranged at a bottom wall of the cavity, and the housing is detachably connected to the fixed seat.

In some embodiments of the present disclosure, the fixed seat is provided with a plurality of stop portions which are arranged at intervals in a circumferential direction of the fixed seat; a plurality of connecting blocks are arranged at the bottom of the housing, and arranged at intervals in a circumferential direction of the housing; when the housing is placed on the fixed seat, the connecting blocks are able to be rotated to positions below the stop portions by rotating the housing.

In some embodiments of the present disclosure, the cleaning device is a movable cleaning bucket; or the cleaning device is an unmovable cleaning sink.

In some embodiments of the present disclosure, the cleaning device further comprises a cleaning brush, and the cleaning brush is arranged in the cavity; when the moving assembly is at the first position, and the panel is connected to the moving assembly, and the panel is connected to the cleaning brush and able to rotate relative to the cleaning brush; and when the moving assembly is at the second position, and the panel is connected to the moving assembly, the panel is separated from the cleaning brush.

An embodiment of the present disclosure further provides a cleaning module, which includes a cleaning tool and the cleaning device of any of the aforementioned embodiments.

In some embodiments of the present disclosure, the cleaning tool comprises a rod body assembly and a panel, wherein the rod body assembly comprises a first rod body; the first rod body connected to the panel, and the panel is configured to be rotatable relative to the first rod body.

In some embodiments of the present disclosure, the cleaning device is a cleaning bucket, the cavity is a bucket body which is configured to be foldable, and a height of the bucket body in a folded state is lower than that of the bucket body in an unfolded state; and the cleaning tool is a mop, and the panel is a mop head.

In conclusion, when the cleaning device provided by the present disclosure is used to wash the cleaning tool, the panel of the cleaning tool can extend into the cavity to be connected to the moving assembly. When the moving assembly is at the first position, the panel can be submerged below a water surface and rotates for cleaning. When the moving assembly is at the second position, the panel connected to the moving assembly rises above the water surface, and in this case, the panel can be rotated for dehydration. According to the cleaning device provided by the present disclosure, the cleaning and dehydration of the panel can be carried out continuously without extra operation steps, which is conducive to improving the convenience and continuity of the whole cleaning process, is particularly suitable for occasions requiring frequent cleaning and use, and can improve the cleaning efficiency.

Figure 1:
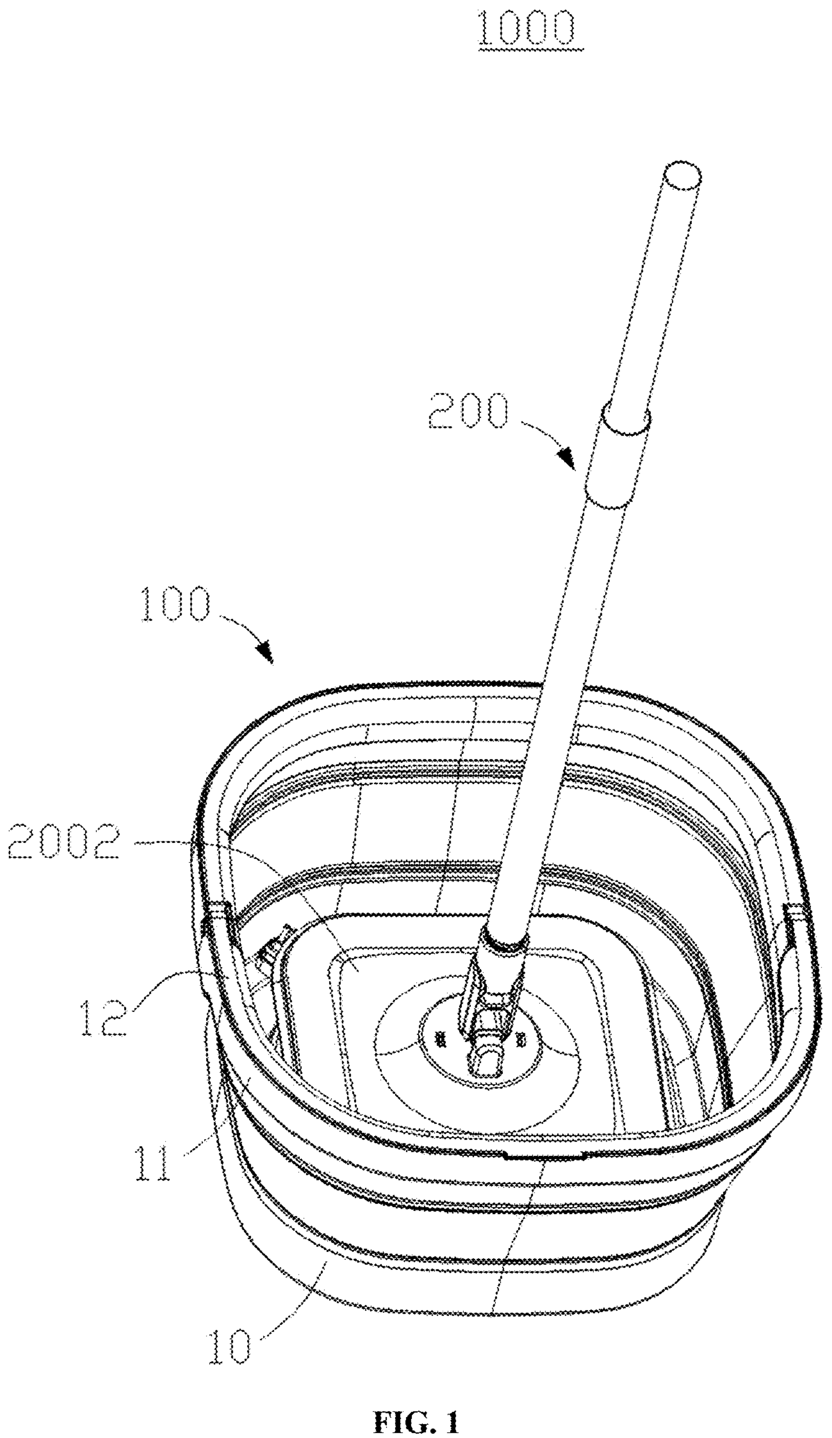
FIG. 1 is a schematic structural diagram of a cleaning module according to an embodiment of the present disclosure.

Reference numerals are as follows:

cleaning module 1000; cleaning bucket 100; bucket body 10; connecting housing 11; handle 12; lifting assembly 20; housing 21; first accommodating cavity 211; limit hole 212; flange 2121; first through hole 213; first guide groove; 214; connecting block 215; bump 2151; moving assembly 22; adjusting rod 221; second accommodating cavity 2211;

second through hole 2212; second guide groove 2213; fixture block 222; connecting portion 2221; round rod 2231; circular plate 2232; special-shaped block 224; chute 2241; connecting rod 225; first elastic member 2261; second elastic member 2262; bottom plate 227; bearing 228; connector 229; fixed seat 30; stop portion 31; groove 311; mop 200; rod body assembly 2001; first rod body 20011; second rod body 20012; panel 2002; trigger block 20021; cleaning brush 300; first direction X; second direction Y; third direction Z.

The present disclosure is further described below with reference to the specific embodiments and in conjunction with the accompanying drawings.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure.

It should be noted that when an element is considered to be "connected" to another element, it can be directly connected to another element or there may be an intervening element. When an element is considered to be "arranged" on another element, it can be directly arranged on another element or there may be an intervening element.

In the description of the embodiments of the present disclosure, the technical terms "first" and "second" are used to distinguish different objects only and are not to be construed as indicating or implying relative importance or implying the number, specific order or primary-secondary relationship of the indicated technical features. In the description of the present disclosure, "a plurality of" means two or more, unless otherwise specifically defined.

The embodiments of the present disclosure are further described below with reference to accompanying drawings.

Figure 2:
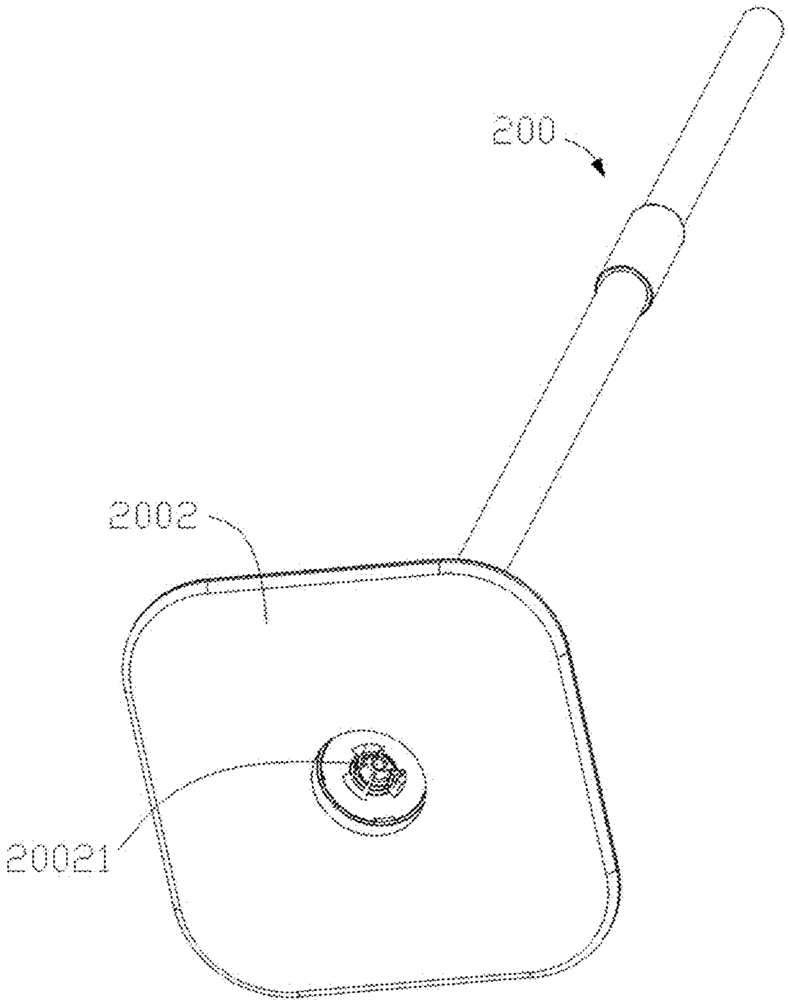
FIG. 2 is a schematic structural diagram of a mop according to an embodiment of the present disclosure.
Figure 3:
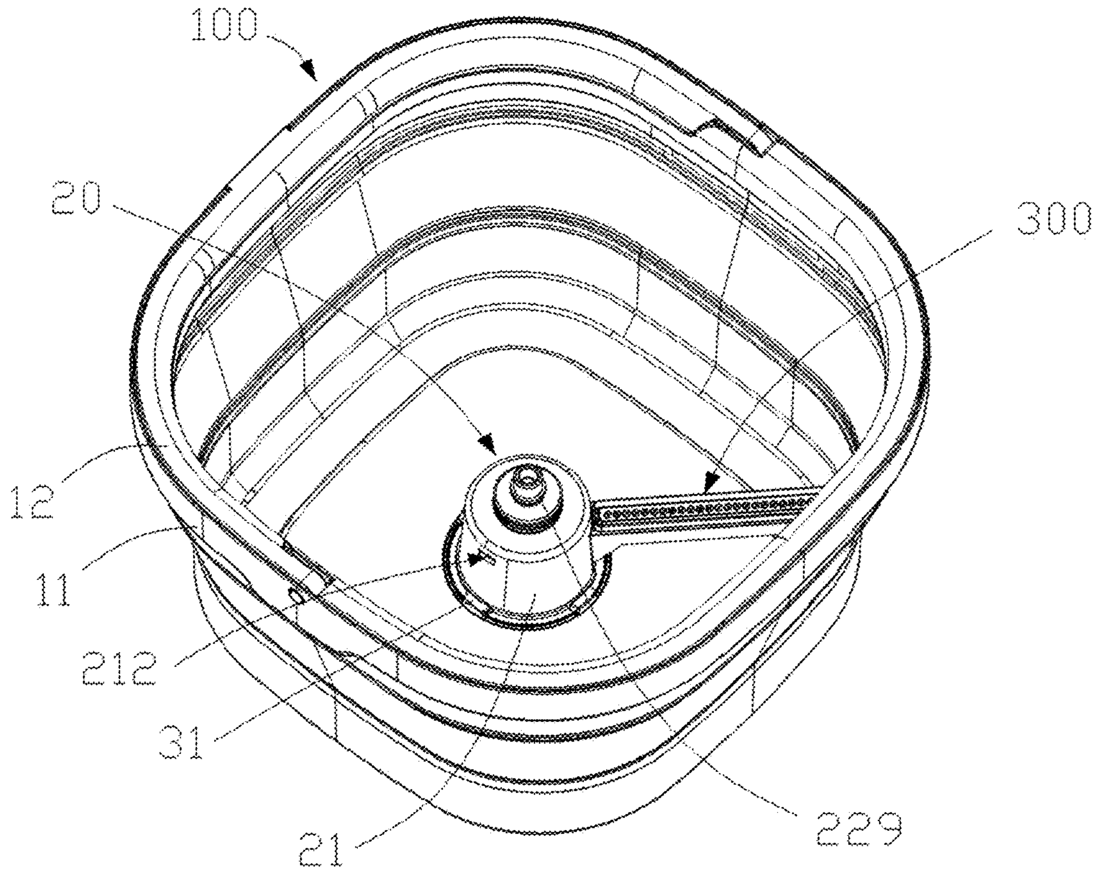
FIG. 3 is a schematic structural diagram of a bucket body of a cleaning bucket according to an embodiment of the present disclosure in an unfolded state.

As shown in FIG. 1 to FIG. 3, an embodiment of the present disclosure provides a cleaning module 1000, including a cleaning device, and a cleaning tool. The cleaning device includes an accommodating cavity for accommodating liquid (e.g., water), and a cleaning panel of the cleaning tool can extend into the accommodating cavity for washing.

In an embodiment, the cleaning device may be a cleaning bucket 100, a cleaning sink, or other devices with a cavity. The cavity can be used to accommodate water.

In an embodiment, the cleaning tool may be a mop 200, or other tools capable of being washed in the cleaning device.

As an example, the present disclosure is further described below with a cleaning bucket 100 as the cleaning device, a bucket body 10 as the cavity, and a mop 200 as the cleaning tool.

In an embodiment, when the bucket body 10 is accommodated with water, the cleaning panel 2002 (hereinafter referred to as a panel 2002) at an end portion of the mop 200 can extend into the bucket body 10 for cleaning.

Figure 4:
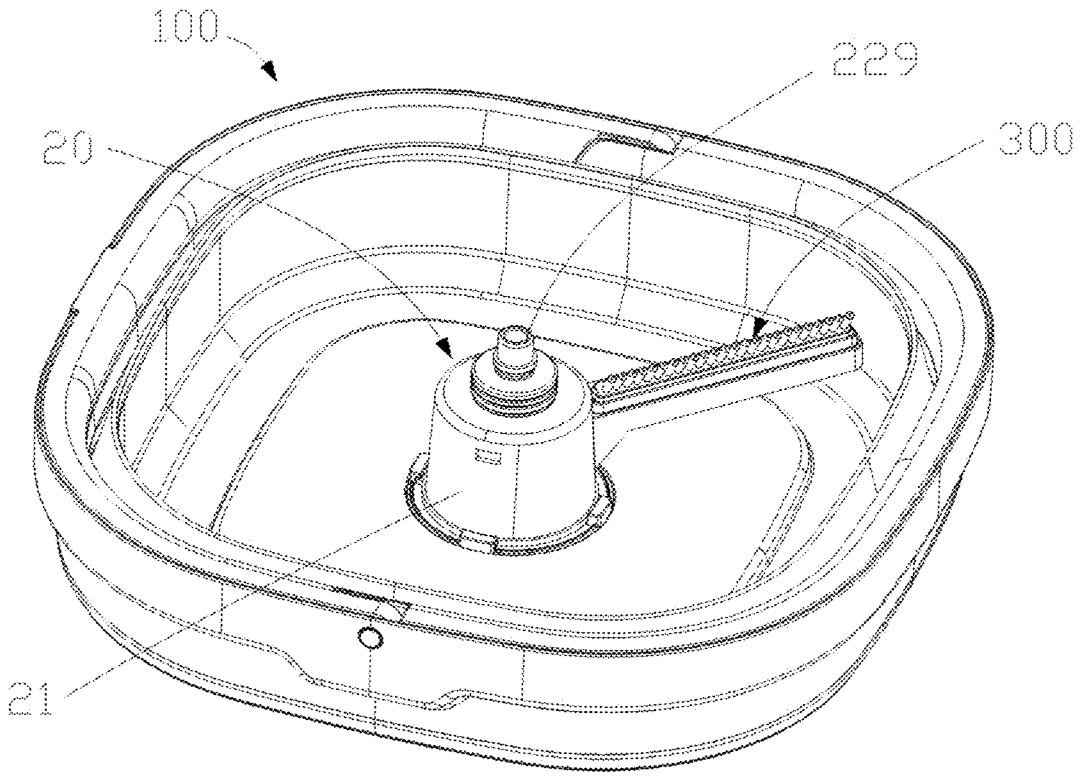
FIG. 4 is a schematic structural diagram of a bucket body of a cleaning bucket according to an embodiment of the present disclosure in a folded state.

As shown in FIG. 3 and FIG. 4, in an embodiment, a sidewall of the bucket body 10 is configured to be foldable, and a height of the sidewall of the bucket body 10 in an unfolded state is higher than that of the sidewall of the bucket body 10 in a folded state. Such an arrangement is convenient for the storage of the cleaning bucket 100, and can reduce adverse effects caused by reducing the volume of the cleaning bucket 100 in a stored state.

Figure 5:
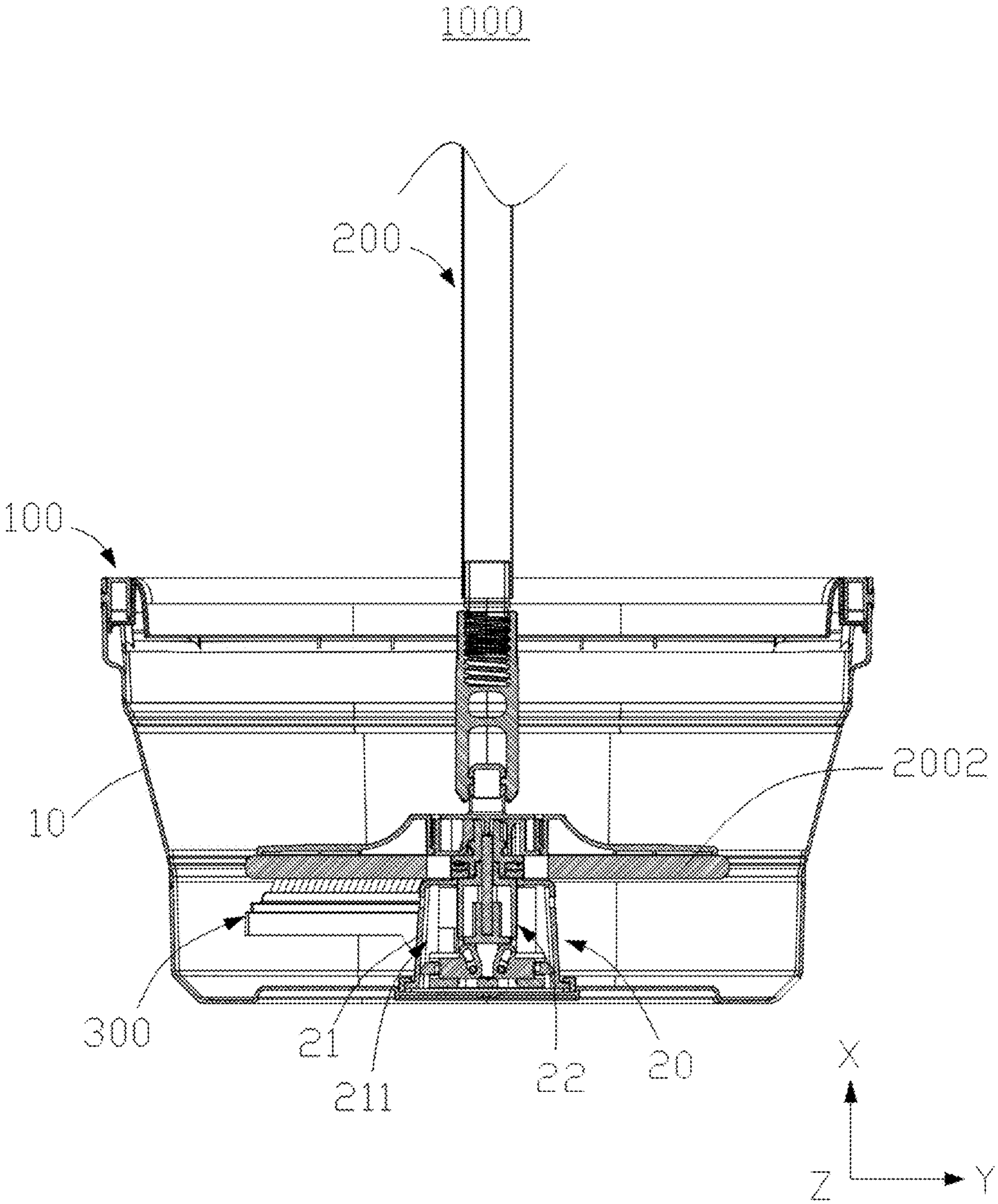
FIG. 5 is a cutaway view of a cleaning module according to an embodiment of the present disclosure when a mop and a lifting assembly is in a connected state.
Figure 6:
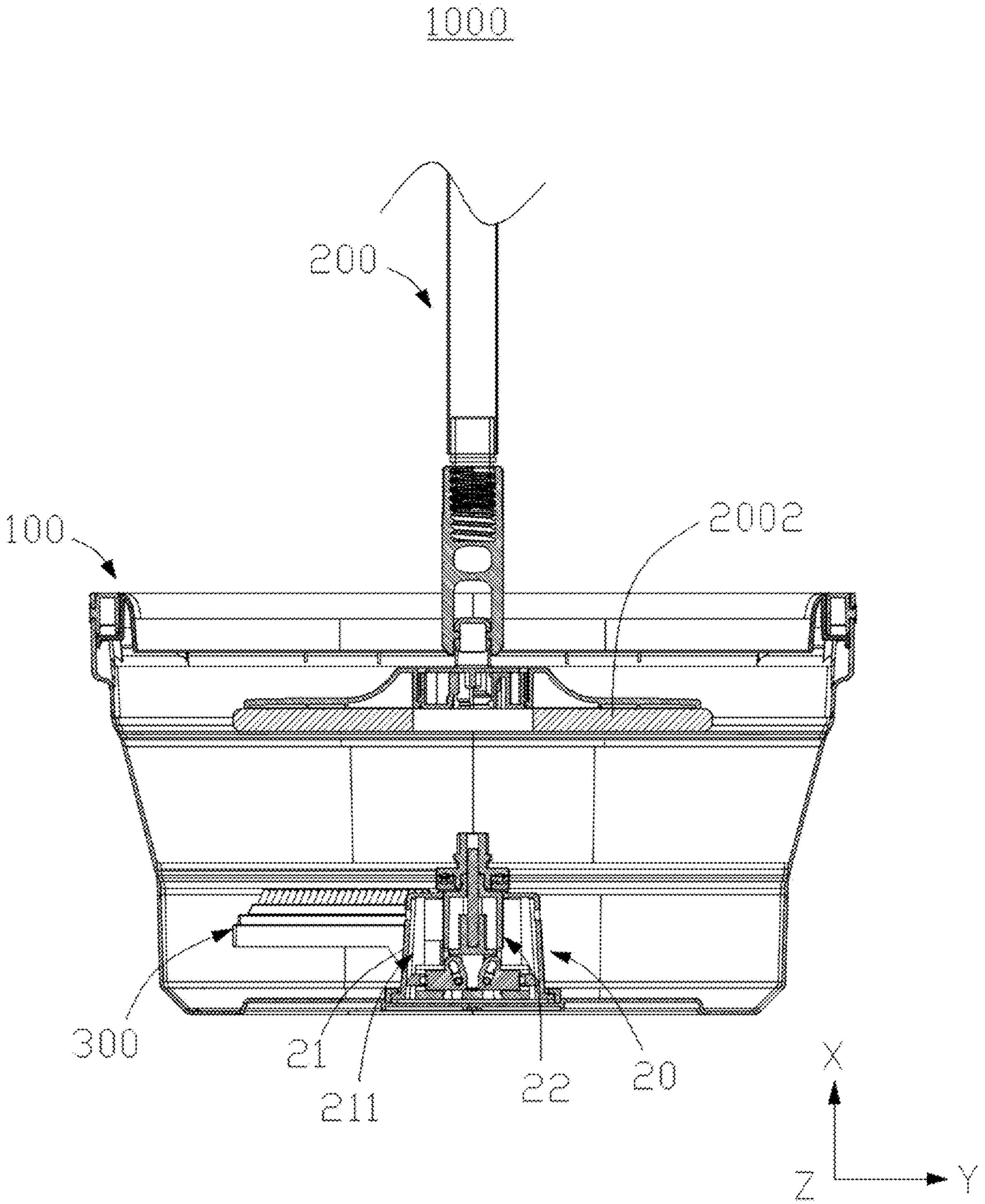
FIG. 6 is a cutaway view of a cleaning module according to an embodiment of the present disclosure when a mop and a lifting assembly are in a separated state.

As shown in FIG. 3, FIG. 5 and FIG. 6, in an embodiment, the cleaning bucket 100 further includes a lifting assembly 20, which is arranged in the bucket body 10. The lifting assembly includes a housing 21, and a moving assembly 22. The housing 21 is connected to a bottom wall of the bucket body 10, and provided with a first accommodating cavity 211. The moving assembly 22 is at least partially arranged in the first accommodating cavity 211, and configured to move in a first direction X relative to the housing 21, where the first direction X is an axial direction of the housing 21. When the cleaning bucket 100 is placed on a horizontal plane, the first direction X and the axial direction of the housing 21 are approximately vertical. It should be noted that "up" and "down" in the following refer to be in the first direction X, or the vertical direction.

In an embodiment, the panel 2002 of the mop 200 can extend into the bucket body 10 to be connected to the moving assembly 22, thus achieving a cleaning or water throwing operation at different positions of the moving assembly 22.

In an embodiment, the moving assembly 22 has a first position and a second position relative to the housing 21, where the second position is higher than the first position. The capacity of water in the bucket body 10 is controlled to make the water surface in a preset height range.

When the moving assembly 22 is at the first position, and the panel 2002 is connected to the moving assembly 22, a lower surface of the panel 2002 is submerged below the water surface, and in this case, the panel 2002 can rotate relative to the bucket body 10 for cleaning.

When the moving assembly 22 rises from the first position to the second position, the moving assembly 22 is fixed relative to the housing 21 (that is, the moving assembly 22 cannot move in the first direction X relative to the housing 21), in this case, the panel 2002 is above the water surface, and can rotate relative to the bucket body 10 for dehydration.

According to such a design, the cleaning and dehydration of the panel can be carried continuously without extra operation steps, which is conducive to improving the convenience and continuity of the whole cleaning process, is particularly suitable for occasions requiring frequent cleaning and use, and can improve the cleaning efficiency. In an embodiment, the moving assembly 22 may also be called a cleaning and spin-drying assembly.

In an embodiment, when the panel 2002 is connected to the moving assembly 22, the moving assembly 22 can be triggered by the panel 2002 to be moved to the first position.

In an embodiment, when the panel 2002 is connected to the moving assembly 22, the moving assembly 22 can be driven to rise from the first position to the second position by lifting the panel 2002.

In an embodiment, the cleaning bucket 100 further comprises a cleaning brush 300, which is arranged in the bucket body 10. When the panel 2002 is connected to the moving assembly 22 and the moving assembly 22 is at the first position, the panel 2002 may be in contact with the cleaning brush 300, in this case, by rotating the panel 2002 or the cleaning brush, dirty things on the panel 2002 can be scraped off by the cleaning brush 200, thus cleaning the panel.

In an embodiment, the cleaning brush 300 is arranged obliquely towards the first direction X, which is convenient for the cleaning brush 300 to make full contact with the panel 2002 to clean the panel 2002. The cleaning effect is improved, and rotation resistance can also be reduced.

In an embodiment, the cleaning brush 300 is fixedly connected to the bucket body 10, and the panel 200 can be configured to rotate relative to the bucket body 10. In other embodiments, the cleaning brush 300 may also be rotatably connected to the bucket body 10 (not shown in the figure), and the cleaning brush 300 is configured to be rotatable. When cleaning the panel 2002, the cleaning brush 300 and the panel 2002 can be rotated simultaneously in opposite directions, which is conducive to improving the cleaning efficiency, or the panel 2002 is fixed and the cleaning brush 300 is rotated.

Figure 7:
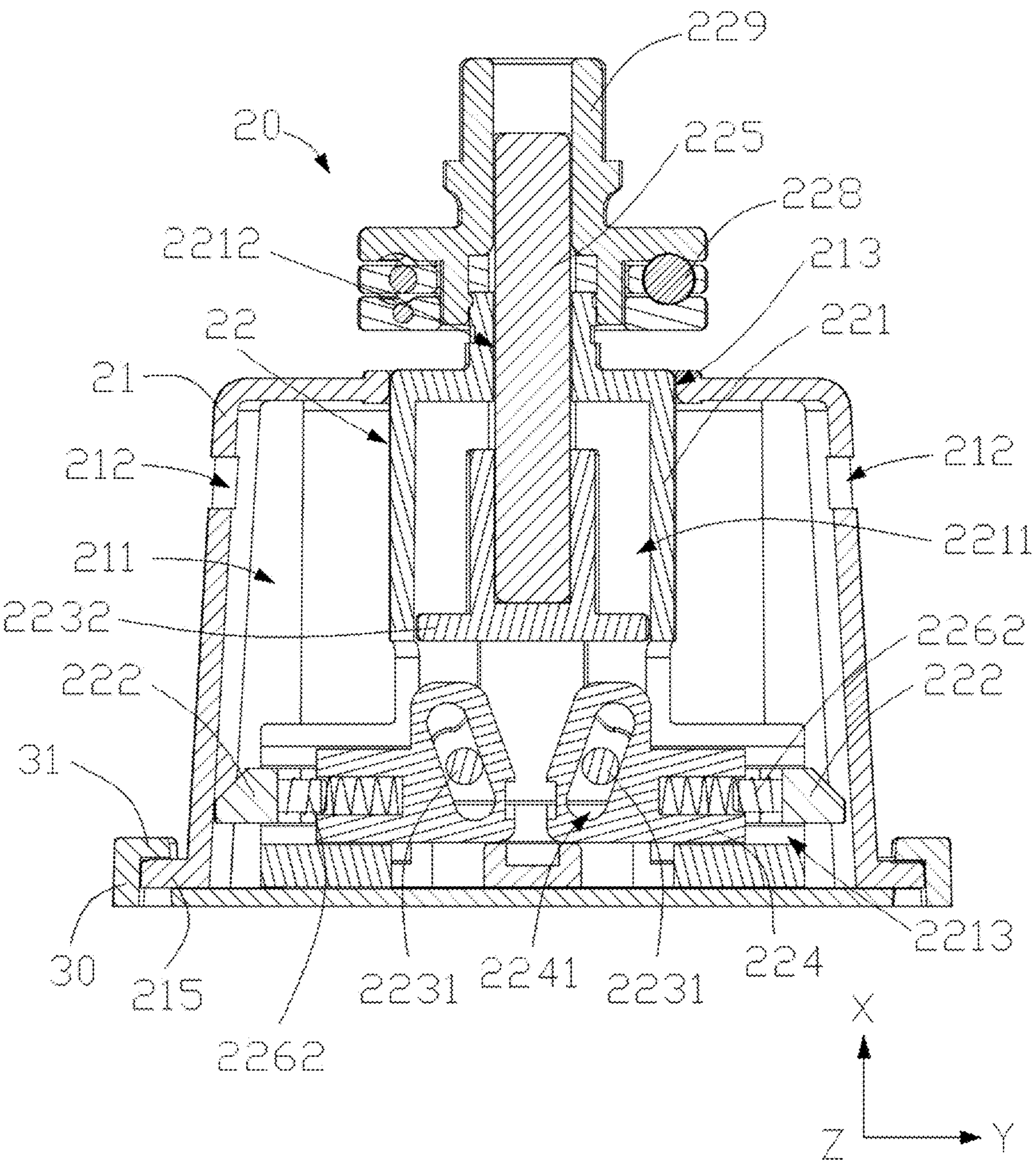
FIG. 7 is a cutaway view of a lifting assembly according to an embodiment of the present disclosure when a moving assembly is at a first position.
Figure 8:
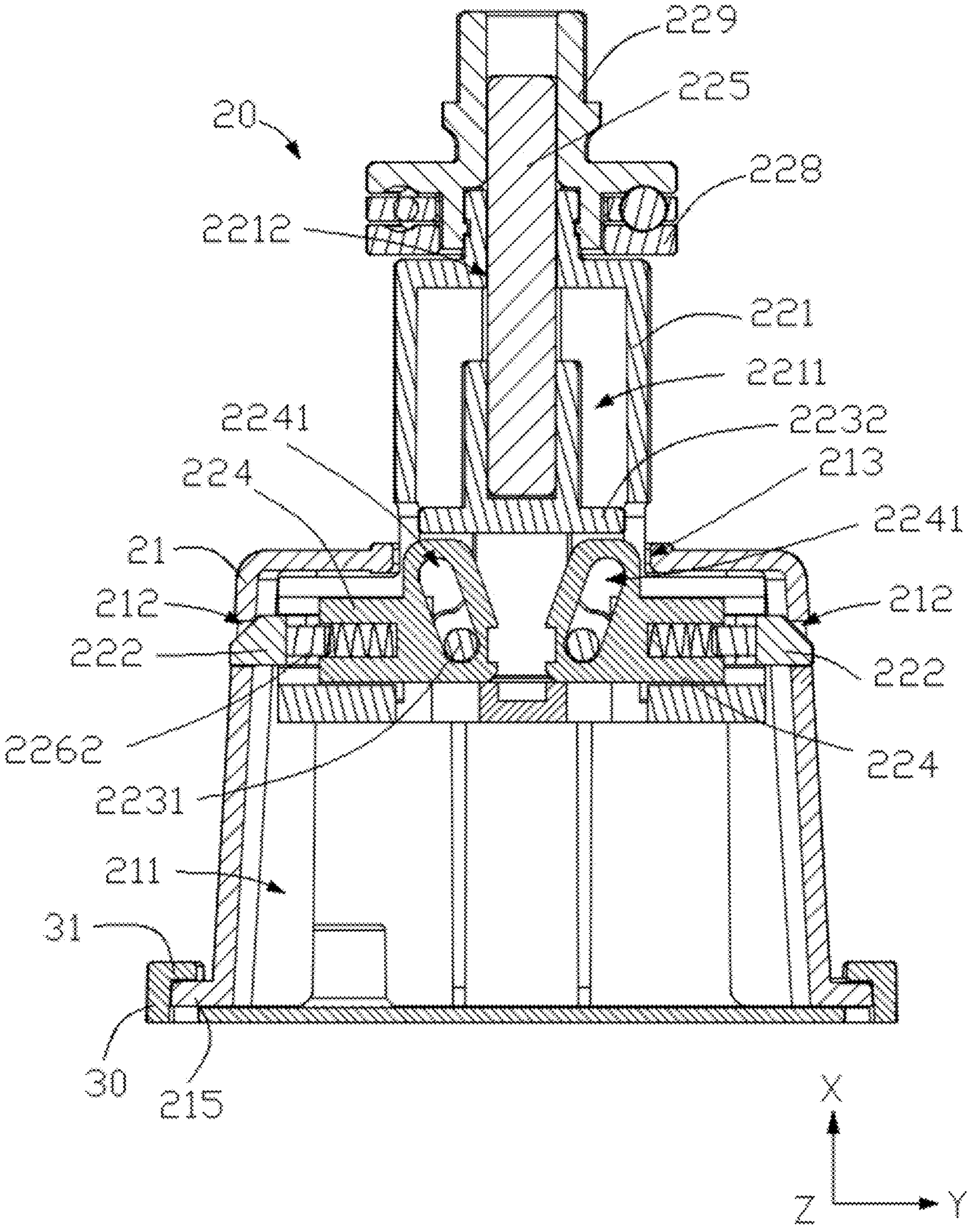
FIG. 8 is a cutaway view of a lifting assembly according to an embodiment of the present disclosure when a moving assembly is at a second position.

As shown in FIG. 2, FIG. 7 and FIG. 8, in an embodiment, the moving assembly 22 includes an adjusting rod 221, and a fixture block 222. At least part of the adjusting rod 221 and the fixture block 222 are arranged in the first accommodating cavity 211, and the fixture block 222 is connected to the adjusting rod 221. The adjusting rod 221 and the fixture block 222 are configured to synchronously move in the first direction X relative to the housing 21, and the fixture block 222 is configured to move in a second direction Y perpendicular to the first direction X relative to the adjusting rod 221. The second direction Y is approximately transverse.

When the moving assembly 22 is at the first position, the fixture block 222 is separated from, or abutted against, an inner wall of the housing 21. In this case, the moving assembly 22 can move upwards relative to the housing 21.

When the moving assembly 22 rises to the second position, the fixture block 222 is connected to the housing 21 in a limited manner, and in this case, the degree of freedom of the moving assembly 22 in the first direction X is limited. If the panel 2002 is connected to the moving assembly 22, a relative movement between the panel 2002 and the bucket body 10 in the first direction X is limited, which is convenient for the panel 2002 for a spin-drying operation.

In an embodiment, the housing 21 is provided with a limit hole 212, and the limit hole 212 is formed in a peripheral wall of the housing 21 and communicates with the first accommodating cavity 211.

When the moving assembly 22 rises to the second position, an end portion of the fixture block 222 is inserted into the limit hole 212. In this case, as the fixture block 222 is inserted into the limit hole 212, a relative movement between the adjusting rod 221 (or the moving assembly 22) and the housing 21 in the first direction X is limited. If the panel 2002 is connected to the moving assembly 22, the relative movement between the panel 2002 and the bucket body 10 in the first direction X is limited, which is convenient for the panel 2002 for the spin-drying operation.

Figure 10:
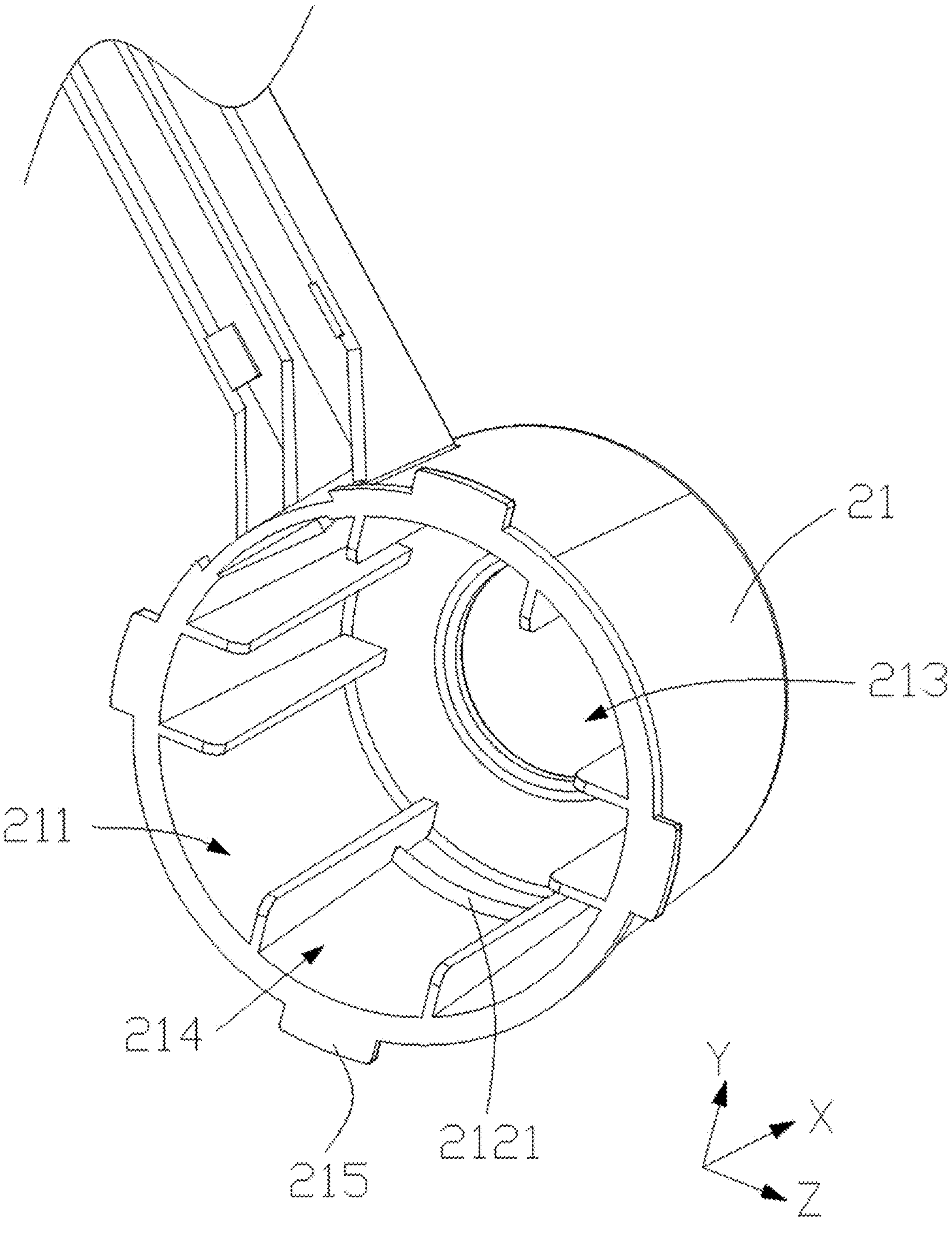
FIG. 10 is a schematic structural diagram of a housing according to an embodiment of the present disclosure.

In an embodiment, an inner side of a sidewall of the housing 21 is provided with a flange 2121 (as shown in FIG. 10). The flange 2121 extends from the sidewall of the housing 21 towards an axis of the housing 21. When the moving assembly rises to the second position, the fixture block 222 is located on the flange 2121 and connected to the flange 2121. In this case, the flange 2121 can provide a support force for the fixture block 222 to limit the downward movement of the moving assembly 22, such that the moving assembly 22 can provide a stable support force for the panel 2002, which is convenient for the panel 2002 the for spin-drying operation.

In an embodiment, a run-through first through hole 213 is formed in a top wall of the housing 21, and the first through hole 213 communicates with the first accommodating cavity 211 and a space in the bucket body 10. When the adjusting rod 221 moves in the first direction X relative to the housing 21, part of an upper end portion of the adjusting rod 221 can penetrate out from the first through hole 213. Further, when the moving assembly 22 is at the second position, part of the upper end portion of the adjusting rod 221 penetrates out of the housing 21 through the first through hole 213.

In an embodiment, the adjusting rod 221 is in sliding connection with the housing 21.

In an embodiment, part of the upper end portion of the adjusting rod 221 is configured to be connectable to the panel 2002, and can move in the first direction X relative to the housing 21 under the driving of the panel 2002. When the moving assembly 22 is at the second position, if the panel 2002 is connected to the adjusting rod 221, the movement of the panel 2002 and the adjusting rod 221 in the first direction X relative to the bucket body 10 is limited.

In an embodiment, when the moving assembly 22 is at the first position, and the panel 2002 is connected to the adjusting rod 221, the panel 2002 is lifted upwards, the panel 2002 can drive the adjusting rod 221 and the fixture block 222 to move upwards, making the moving assembly 222 rise from the first position to the second position. That is, a washing mode is switched to a water throwing mode, which is convenient for the continuous operation of washing and spin-drying, and conducive to improving the efficiency of washing the mop 200.

In an embodiment, the moving assembly 22 further includes a round rod 2231, and a special-shaped block 224. The round rod 2231 and the special-shaped block 224 are arranged in the first accommodating cavity 211.

The special-shaped block 224 is connected to the adjusting rod 221 and the fixture block 222, the adjusting rod 221 can drive the special-shaped block 224 to move synchronously in the first direction X, and the special-shaped block 224 is configured to drive the fixture block 222 to move in the second direction Y relative to the adjusting rod 221.

In an embodiment, the round rod 2231 can act on the special-shaped block 224, making the special-shaped block 224 move in the second direction Y.

In an embodiment, the special-shaped block 224 is provided with a chute 2241, and part of the round rod 2231 is arranged in the chute 2241. Through the fitting of the round rod 2231 and the chute 2241, a drive force of the round rod 2231 in the first direction X can be at least partially converted to a drive force of the special-shaped block 224 in the second direction Y, making the special-shaped block 224 and the fixture block 222 move in the second direction Y.

In other embodiments, the special-shaped block 224 may be provided with a wedge surface (not shown), and the round rod 2231 is connected to the wedge surface. The round rod 2231 can drive the special-shaped block 224 to move in the second direction Y by pressing against the wedge surface.

As an example, a situation that the special-shaped block 224 is provided with a chute 2241 and part of the round rod 2231 is arranged in the chute 2241 is used as an example for further description.

In an embodiment, the round rod 2231 is configured to be movable in the first direction X relative to the housing 21. When the round rod 2231 moves in the first direction X relative to the housing 21, the round rod 2231 is in fit with the chute 2241 to make the special-shaped block 224 drive the fixture block 222 to move in the second direction Y, and make the special-shaped block 224 drive the fixture block 222 to move in the first direction X.

In an embodiment, an extending direction of the chute 2241 is inclined towards the first direction X and the second direction Y. Specifically, an included angle between the extending direction of the chute 2241 and the first direction X is an acute angle, and an included between the extending direction of the chute 2241 and the second direction Y is also an acute angle. Moreover, in the second direction Y, the bottom of the chute 2241 is closer to the axis of the housing 21 than the top. According to such an arrangement, when the round rod 2231 moves downwards (i.e., towards a bottom wall of the housing 21) in the first direction X, the round rod 2231 moves towards the bottom of the chute 2241 along the chute 2241, the special-shaped block 224 is enabled to move outwards (i.e., in a direction away from the axis of the housing 21) in the second direction Y, and an end portion of the special-shaped block 224 gradually approaches the inner wall of the housing 21. When the round rod 2231 moves upwards (i.e., towards a top wall of the housing 21) in the first direction X, the round rod 2231 moves towards the top of the chute 2241 along the chute 2241, the special-shaped block 224 is enabled to move inwards (i.e., in a direction facing the axis of the housing 21) in the second direction Y, and the end portion of the special-shaped block 224 gradually moves away from the inner wall of the housing 21.

In an embodiment, the moving assembly 22 has an initial position. When the moving assembly 22 is at the initial position, the round rod 2231 is located at the top of the chute 2241, and the end portion of the fixture block 222 is separated from, or abutted against, the inner wall of the housing 21.

Further, when the moving assembly 22 is at the first position, the round rod 2231 is located at a middle part of the chute 2241, and the end portion of the fixture block 222 is abutted against the inner wall of the housing 21. It should be noted that when the moving assembly is at the initial position, a height of the round rod 2231 relative to the adjusting rod 221 is higher than that of the round rod 2231 relative to the adjusting rod 221 when the moving assembly 22 is at the first position. That is, at the initial position, when the round rod 2231 is subjected to a downward acting force, the round rod 2231 moves downwards relative to the adjusting rod 221, and then moves from the top thereof to the middle part along the chute 2241, which makes part of the fixture block 222 protrude outwards to abut against the inner wall of the housing 21.

Further, when the moving assembly 22 is at the first position, the moving assembly 22 can no longer move downwards relative to the housing 21, in this case, if the panel 2002 is connected to the adjusting rod 221, the adjusting rod 221 (or the moving assembly 22) can provide a stable upward support force for the panel 2002 to facilitate the cleaning of the panel 2002.

When the moving assembly 22 is at the second position, the moving assembly 22 cannot move upwards or downwards relative to the housing 21. In this case, if the panel 2002 is connected to the adjusting rod 221, the adjusting rod 221 (or the moving assembly 22) can provide a stable upward support force for the panel 2002 to facilitate the water throwing operation of the panel 2002.

In an embodiment, the moving assembly 22 further includes a connecting rod 225. Part of a lower end of the connecting rod 225 extends into the first accommodating cavity 211 to be connected to the round rod 2231, and part of an upper end of the connecting rod 225 is arranged at the top of the adjusting rod 221 in a penetrating manner. The connecting rod 225 and the round rod 2231 are configured to be movable in the first direction X relative to the adjusting rod 221, or to move in synchronization with the adjusting rod 221.

In an embodiment, when the moving assembly 22 is at an initial position, if the connecting rod 225 is subjected to a downward pressure from the outside, the connecting rod 225 is about to drive the round rod 2231 to synchronously move downwards. Through the fitting of the round rod 2231 and the chute 2241, the special-shaped block 224 is enabled to drive the fixture block 222 and the adjusting rod 221 to move downwards.

In an embodiment, the panel 2002 is provided with a trigger block 20021. When the panel 2002 is connected to the adjusting rod 221, the trigger block 20021 is pressed against a top end of the connecting rod 225 to apply a downward pressure to the connecting rod 225.

Figure 11:
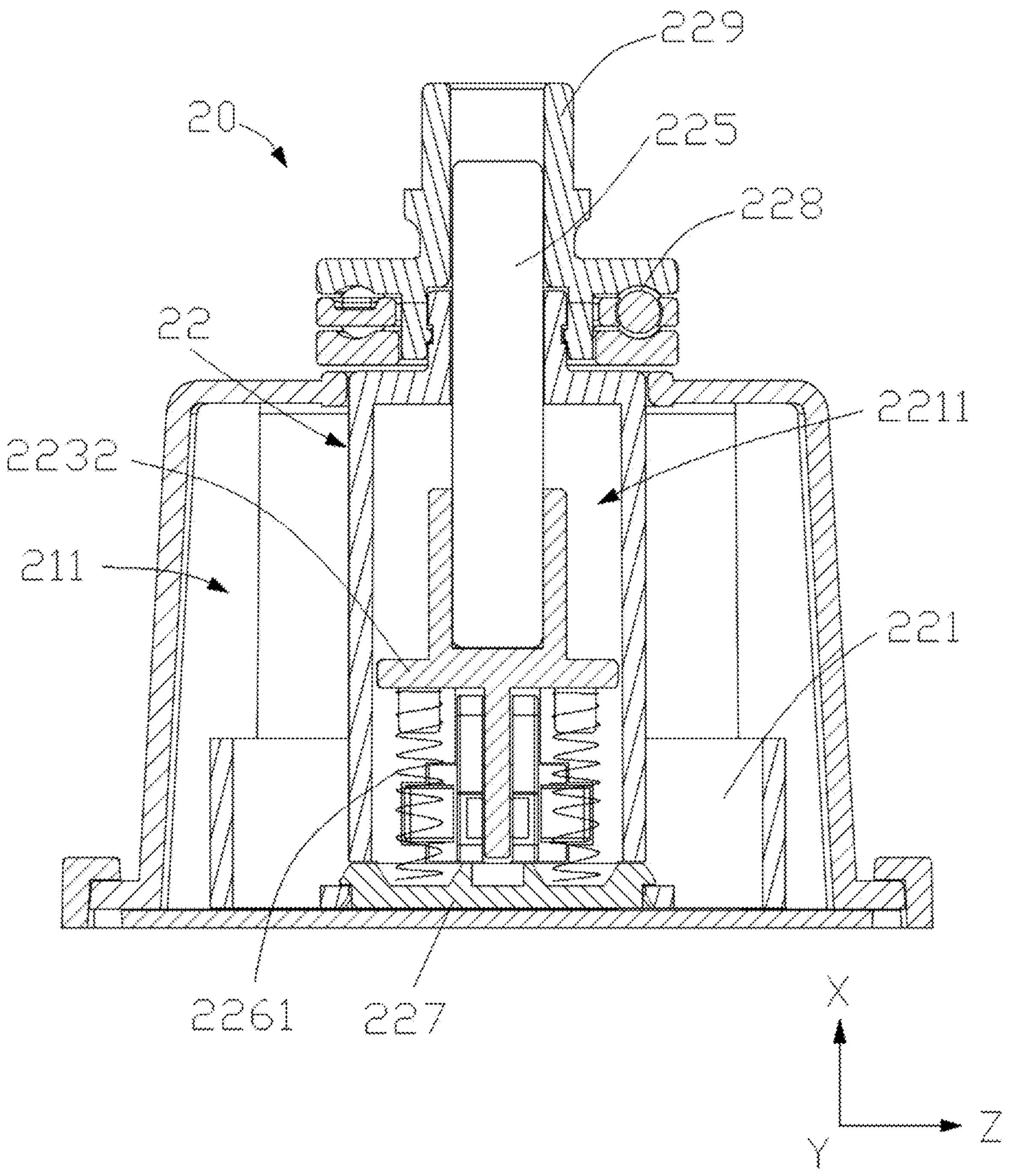
FIG. 11 is a cutaway view of a lifting assembly according to an embodiment of the present disclosure.
Figure 12:
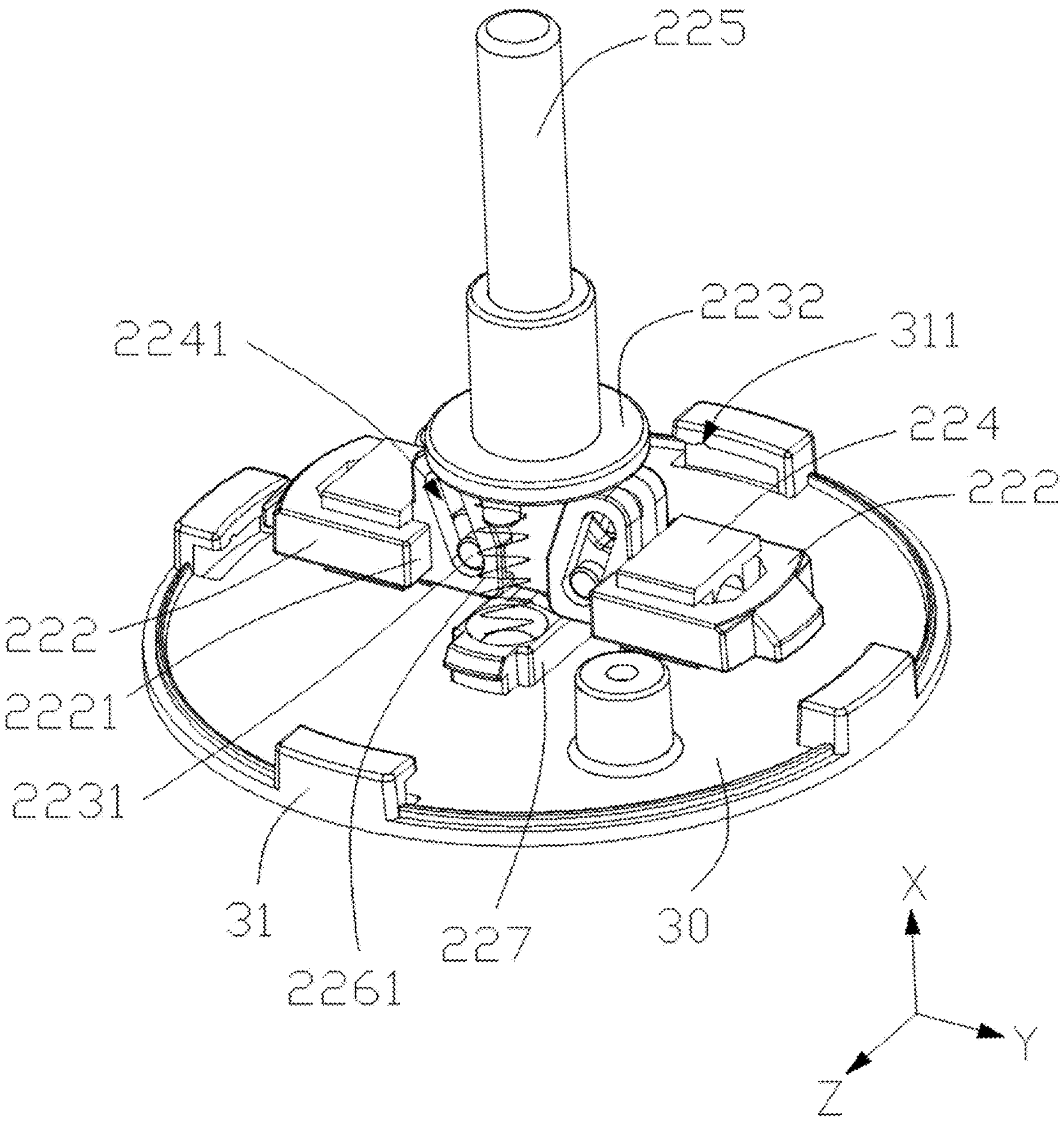
FIG. 12 is a schematic structural diagram of part of a lifting assembly according to an embodiment of the present disclosure.

As shown in FIG. 2, FIG. 11 and FIG. 12, in an embodiment, the moving assembly 22 further includes a first elastic member 2261. The first elastic member 2261 is connected to the adjusting rod 221 and the round rod 2231, and configured to apply an upward thrust to the round rod 2231, making the moving assembly 22 tend to return to its initial position. When an external force acting on the connecting rod 225 disappears or decreases, the round rod 2231 and the connecting rod 225 move upwards under the thrust of the first elastic member 2261, which helps the moving assembly 22 to return to the initial position.

In an embodiment, the moving assembly 22 includes two first elastic members 2261 which are arranged at intervals in a third direction Z, and located at both sides of the axial direction of the housing 21, respectively. The arrangement of the two first elastic members 2251 are conducive to improving the stability of upward movement of the connecting rod 225 and the round rod 2231. The third direction Z is perpendicular to the first direction X and the second direction Y, and the third direction Z and the second direction Y are approximately transverse.

In an embodiment, the first elastic member 2261 is a compression spring.

As shown in FIG. 2, FIG. 7 to FIG. 9, in an embodiment, the moving assembly 22 further includes a second elastic member 2262. The second elastic member 2262 is connected to the special-shaped block 224 and the fixture block 222, and configured to apply an outward thrust in the second direction Y to the fixture block 222, making the fixture block 222 always have a tendency to abut against the inner wall of the housing 21 outwards, which is beneficial to the insertion of the fixture block 222 into the limit hole 212 and improving the working stability of the lifting assembly 20 and the stability of the moving assembly 22 at the second position.

In an embodiment, the second elastic member 2262 is a compression spring.

As shown in FIG. 7 and FIG. 12, in an embodiment, the fixture block 222 is provided with a connecting portion 2221, the connecting portion 2221 is located at one side, close to the axis of the housing 21, of the fixture block 222. When the fixture block 222 moves outwards in the second direction Y, the connecting portion 2221 is used to connect the special-shaped block 224 to prevent the fixture block 222 from moving outwards continuously.

In an embodiment, the moving assembly 22 includes two special-shaped blocks 224 which are at intervals in the second direction Y, and located at both sides of the axis of the housing 21, respectively. The moving assembly 22 includes two round rods 2231 which are arranged at intervals in the second direction Y, and located in corresponding chutes 2241, respectively. The moving assembly 22 includes two fixture blocks 222 which are arranged at intervals in the second direction Y, and connected to the corresponding special-shaped blocks 224, respectively. The housing 21 is provided with two limit holes 212 which are arranged in the second direction Y. When the moving assembly 22 is at the second position, one fixture block 222 is inserted into one limit hole 212, and the other fixture block 222 is inserted into the other limit hole 212. Such an arrangement is conducive to improving the stability of the moving assembly 22 at the second position, thus providing a stable support force for the mop 200 to facilitate the washing and spin-drying of the mop 200.

As shown in FIG. 7 to FIG. 9, FIG. 12 to FIG. 14, in an embodiment, the moving assembly 22 further includes a circular plate 2232, the circular plate 2232 is connected to the round rod 2231 and the connecting rod 225, and the circular plate 2232, the round rod 2231 and the connecting rod 225 can move synchronously in the first direction X. The circular plate 2232 is provided to connect the round rod 2231 and the connecting rod 225, which is conducive to simplifying the machining and manufacturing technology of various spare and accessory parts. In an embodiment, any two or at least two of the circular plate 2232, the round rod 2231 and the connecting rod 225 may be integrally formed.

In an embodiment, an upper end portion of the first elastic member 2261 is connected to the circular plate 2232, and the first elastic member 2261 is configured to apply an upward thrust to the circular plate 2232. Such an arrangement is conducive to improving the connection stability of the first elastic member 2261, thus reducing the risk of displacement of the first elastic member 2261.

In an embodiment, the moving assembly 22 further includes a bottom plate 227. The bottom plate 227 is assembled and connected to the adjusting rod 221, the bottom of the first elastic member 2261 is connected to the bottom plate 227, and the bottom plate 227 is configured to provide an upward support force for the first elastic member 2261. Such an arrangement is conducive to simplifying machining and manufacturing technology of various parts, saving cost, and facilitating the assembly, disassembly and maintenance.

Figure 13:
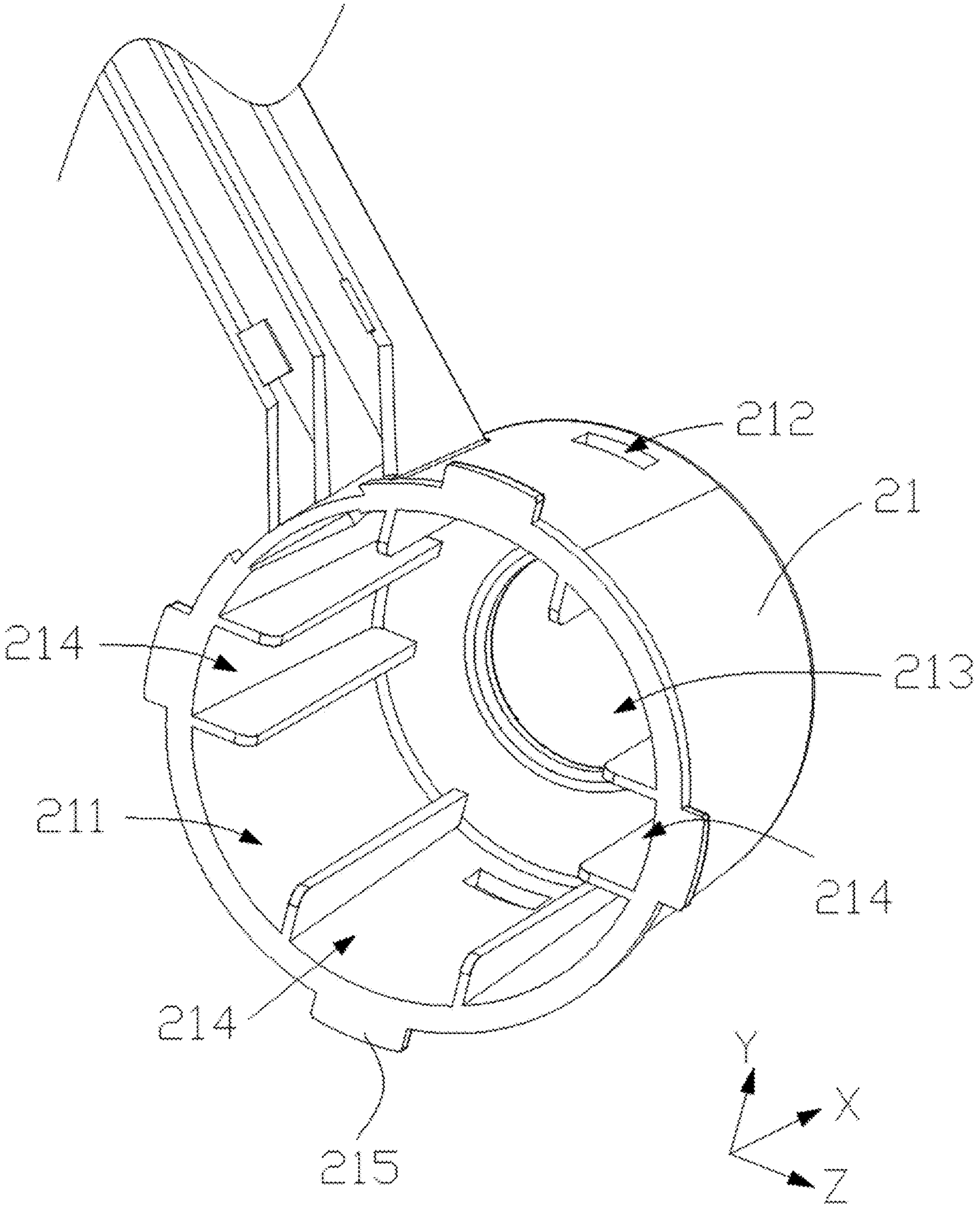
FIG. 13 is a schematic structural diagram of a housing according to an embodiment of the present disclosure.

In an embodiment, the inner wall of the housing 21 is provided with a first guide groove 214 (as shown in FIG. 13), the fixture block 222 or the adjusting rod 221 is at least partially arranged in the first guide groove 214, and the fixture block 222 or the adjusting rod 221 can move in the first direction X under the guidance of the first guide groove 214. The arrangement of the first guide groove 214 is conducive to guiding the fixture block 222 to move relative to the housing 21, and limiting the rotation of the moving assembly 22.

In an embodiment, the housing 21 is provided with multiple first guide grooves 214. The multiple first guide grooves 214 are arranged at intervals in a circumferential direction of the housing 21. Some of the first guide grooves 214 are used to accommodate the fixture block 222 and some of the first guide grooves 214 are used to accommodate the adjusting rod 221, which is further conducive to guiding the fixture block 222 to move relative to the housing 21, and limiting the rotation of the moving assembly 22.

In an embodiment, a diameter of the inner wall of the housing 21 decreases from bottom to top in the first direction X. When the fixture block 222 moves upwards relative to the housing 21, the inner wall of the housing 21 applies an acting force toward the axis of the housing 21 to the fixture block 222, making the fixture block 222 compress the second elastic member 2262 to move inwards.

In an embodiment, the adjusting rod 221 is provided with a second accommodating cavity 2211 and a second through hole 2212. The second accommodating cavity 2211 extends in the first direction X, and the second through hole runs through a top wall of the adjusting rod 221 in the first direction X. Part of the connecting rod 225 and the circular plate 2232 are arranged in the second accommodating cavity 2211, and an upper end portion of the connecting rod 225 is arranged in the second through hole 2212 in a penetrating manner.

In an embodiment, the adjusting rod 221 is further provided with a second guide groove 2213, which extends in the second direction Y and communicates with the second accommodating cavity 2211 and the first accommodating cavity 211. Part of the special-shaped block 224 and part of the fixture block 222 are arranged in the second guide groove 2213. The arrangement of the second guide groove 2213 is conducive to improving the stability of the special-shaped block 224 and the fixture block 222 when moving in the second direction Y. Moreover, through an upper wall or a lower wall of the second guide wall 2213, the adjusting rod 221, the special-shaped rod 224 and the fixture block 222 can move synchronously in the first direction X.

Figure 9:
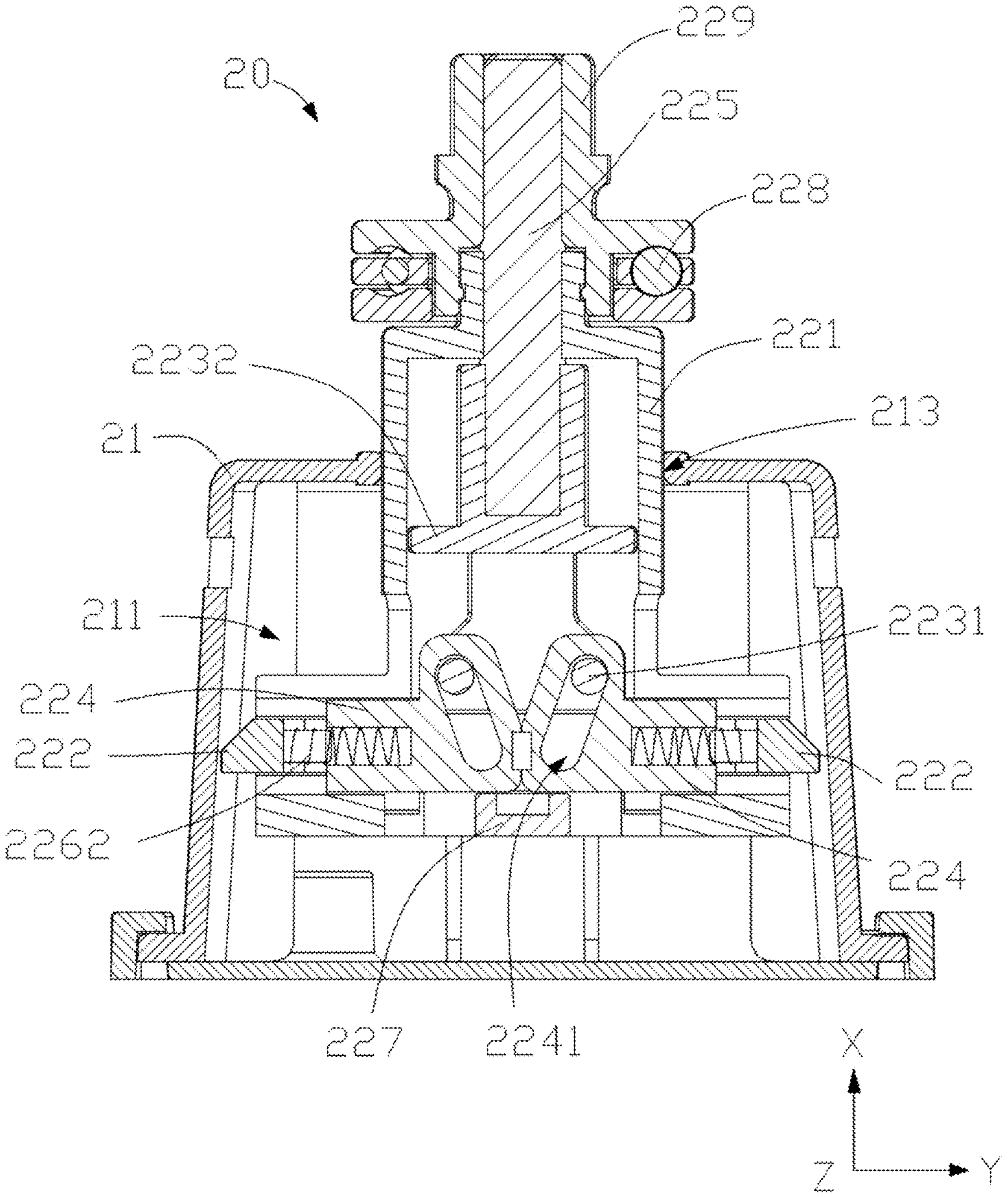
FIG. 9 is a cutaway view of a lifting assembly according to an embodiment of the present disclosure when a moving assembly is at an initial position.
Figure 14:
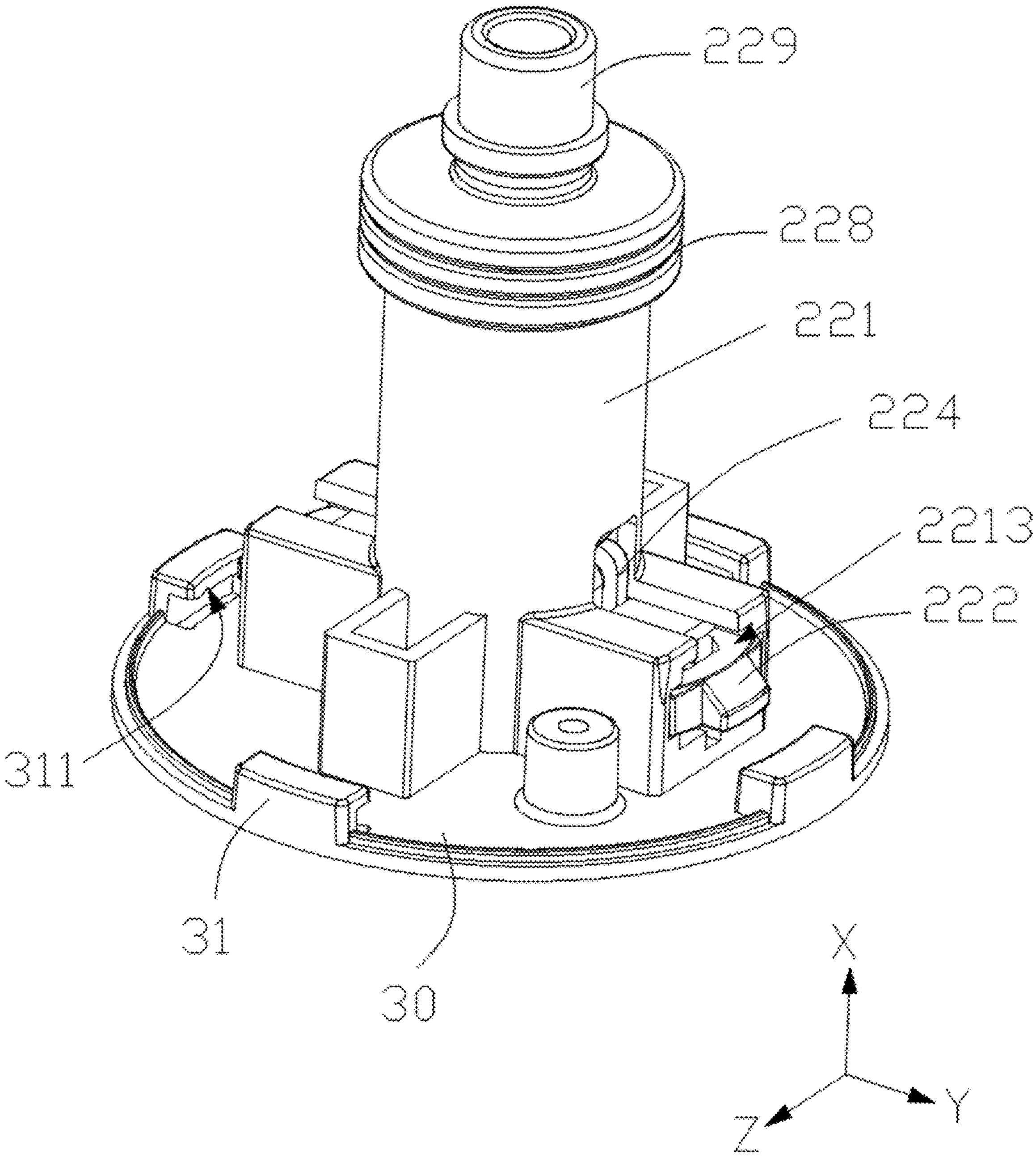
FIG. 14 is a schematic structural diagram of part of a lifting assembly according to an embodiment of the present disclosure.

As shown in FIG. 2, FIG. 9 and FIG. 14, in an embodiment, the moving assembly 22 further includes a bearing 228 which is located above the top wall of the housing 21 and connected to the adjusting rod 221. When the panel 2002 is connected to the moving assembly 22, the panel 2002 is connected to the bearing 228. Such an arrangement is conducive to improving the smoothness of the rotation of the panel 2002 relative to the moving assembly 22, and further facilitating the washing and water throwing operations.

In an embodiment, the moving assembly 22 further includes a connector 229. The connector 229 is at least partially located above the top wall of the housing 21, connected to the adjusting rod 221 and the bearing 228, and configured to be rotatable relative to the adjusting rod 221. When the panel 2002 is connected to the moving assembly 22, the panel 2002 and the connector 220 are clamped with each other, a relative movement between the panel 2002 and the connector 229 in the first direction X is limited, and the panel 2002 can rotate relative to the connector 229 and the adjusting rod 221 through the bearing 228.

In an embodiment, when the panel 2002 is clamped with the connector 229, the panel 2002 and the connector 229 are in elastic clamping. By increasing an upward lifting force acting on the panel 2002, the panel 2002 can be disconnected from the connector 229 to achieve the separation of the panel 2002 from the moving assembly 22.

Figure 15:
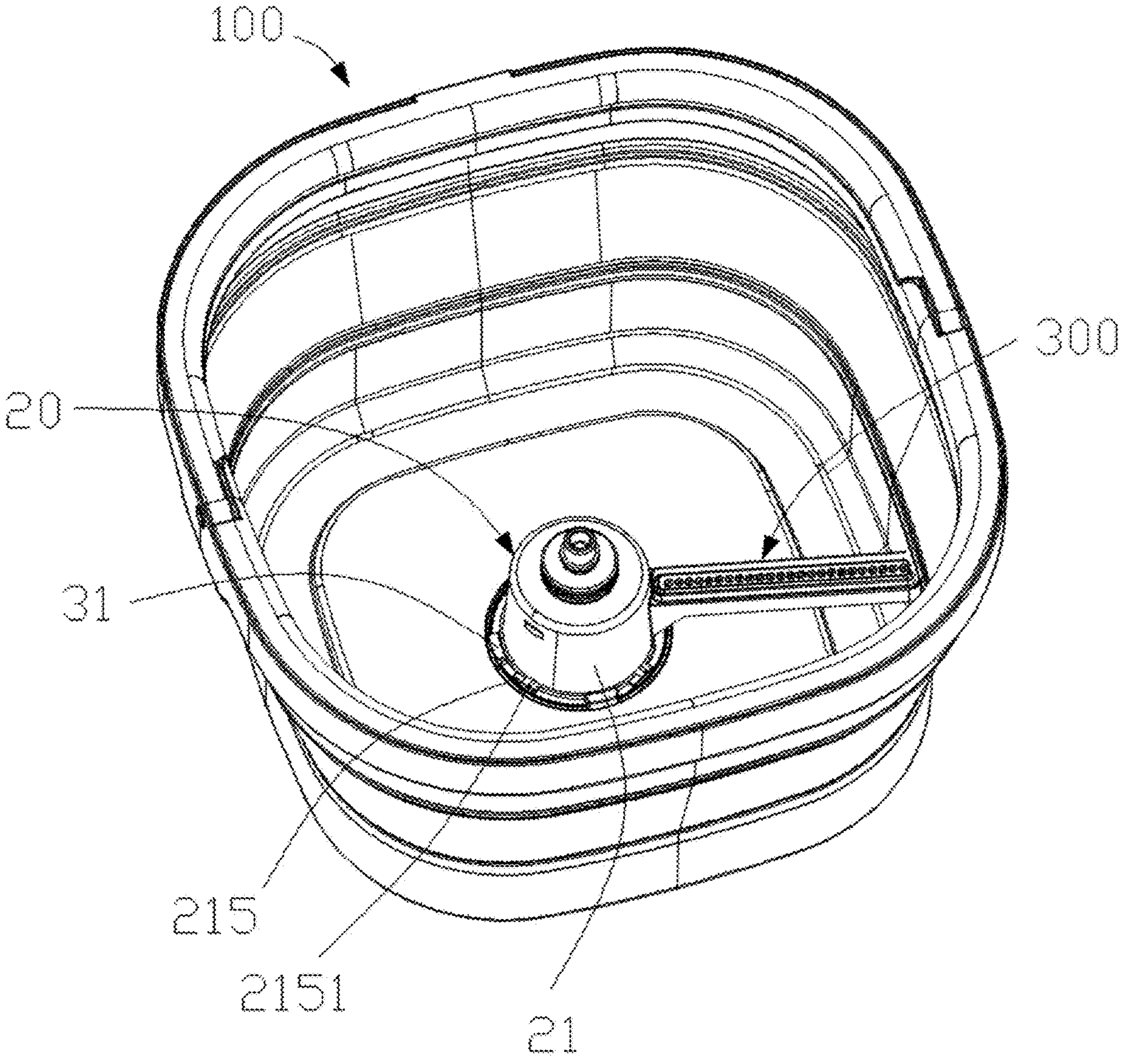
FIG. 15 is a schematic structural diagram of a connection between a lifting assembly and a base according to an embodiment of the present disclosure.
Figure 16:
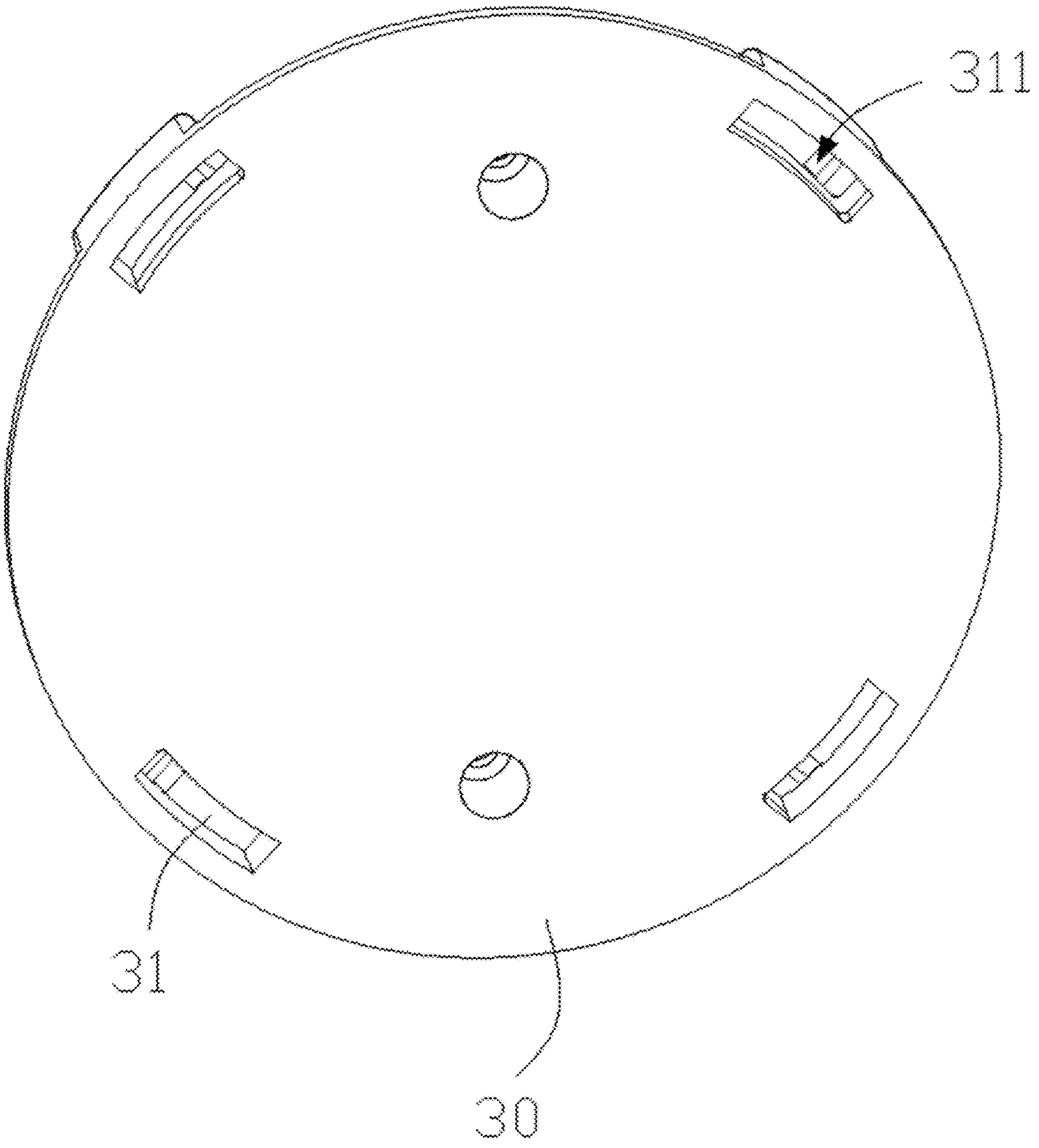
FIG. 16 is a schematic structural diagram of a base according to an embodiment of the present disclosure.

As shown in FIG. 3, FIG. 15 and FIG. 16, in an embodiment, the lifting assembly 20 is detachably connected to the bucket body 10.

In an embodiment, the cleaning bucket 100 further includes a fixed seat 30. The fixed seat 30 is fixedly arranged at the bottom of the bucket body 10, and the housing 21 is detachably connected to the fixed seat 30. When the housing 21 is connected to the fixed seat 30, the housing 21 forms a first cavity with the fixed seat 30. By designing the housing 21 to be detachably connected to the fixed seat 30, the assembly and maintenance are convenient, and an application scenario of the bucket body 10 is increased. That is, when there is no need of the lifting assembly 20, the lifting assembly 20 can be removed by detaching the housing 21.

In an embodiment, the fixed seat 30 is provided with multiple stop portions 31 which are arranged at intervals in a circumferential direction of the fixed seat 30. Multiple connecting blocks 215 are arranged at the bottom of the housing 21, and arranged at intervals in a circumferential direction of the housing 21. When the housing 21 is placed on the fixed seat 30, the connecting blocks 215 can be rotated to positions below the stop portions 31 by rotating the housing 21. The connection mode is simple and convenient, and is conducive to assembly and disassembly.

In an embodiment, the bottom of each stop portion 31 is provided with a groove 311, and the top of each connecting block 215 is provided with a bump 2151. When the connecting block 215 rotates to a position below the stop portion 31, the bump 2151 is inserted into the groove 311. Such an arrangement is conducive to improving the connection stability between the housing 21 and the base, and reducing the risk that the housing 21 is separated from the base due to shake.

In an embodiment, the top of the bucket body 10 is provided with a connecting housing 11, a handle 12 is rotatably connected into the connecting housing 11, and the handle 12 is used for the user to hold to lift the bucket body 10.

In an embodiment, one end of the bucket body 10 is provided with a drainage pipe (not shown in the figure). One end of the drainage pipe is provided with a seal plug, and the drainage pipe is used to drain the water in the bucket body 10, while the existence of the seal plug is to block the drainage pipe, thus reducing the risk of water leakage when not draining.

The handle 12 facilitates the lifting of the bucket body 10, and the drainage pipe is used to drain the sewage in the bucket body 10, thus avoid an operation of frequently lifting the bucket body 10 to pour water when cleaning the mop 200. When drainage is needed, it is only necessary to take out the seal plug at the drainage pipe, or take out the seal plug to connect the drainage pipe to a pipeline, and then the cleaned sewage can be directly drained, thus saving the time and labor for pouring water.

Figure 17:
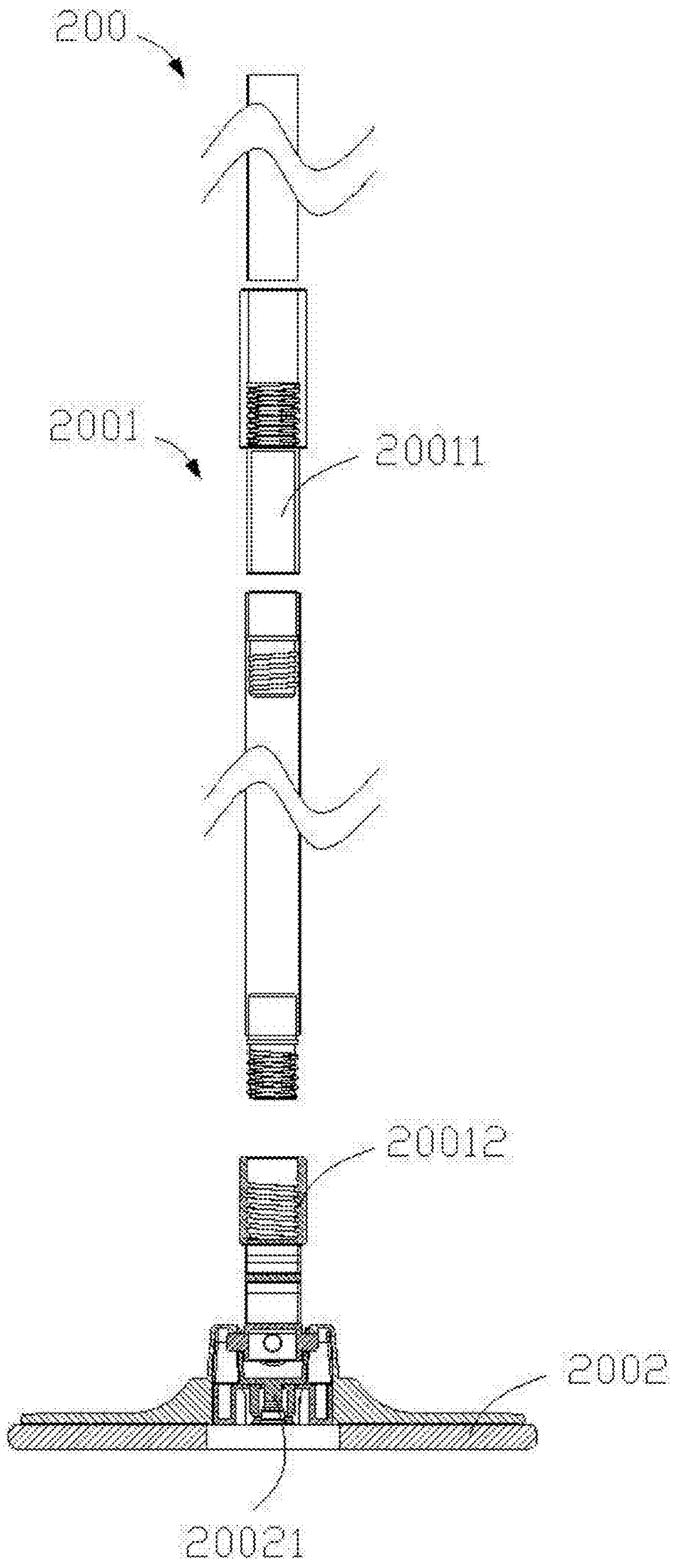
FIG. 17 is an exploded view of a rod body assembly according to an embodiment of the present disclosure.

As shown in FIG. 1, FIG. 2 and FIG. 17, in an embodiment, the mop 200 includes a rod body assembly 2001 and the panel 2002 connected to each other. The rod body assembly 2001 can drive the panel 2002 to rotate, or the rod body assembly 2001 can rotate relative to the panel 2002.

In an embodiment, the rod body assembly 2001 includes a first rod body 20011, and a second rod body 20012. An end portion of the first rod body 20011 is threaded to an end portion of the second rod body 20012, and an end portion, away from the first rod body 20011, of the second rod body 20012 is connected to the panel 2002. When the first rod body 20011 and the second rod body 20012 move relative to each other in an axial direction thereof, a drive force of linear movement can be converted into a drive force of rotation, making the first rod body 20011 and the second rod body 20012 rotate relative to each other, and the panel 2002 rotate relative to the first rod body 20011. Further, when the moving assembly 22 is at the first position or the second position, the first rod body 20011 is pressed to make the second rod body 20012 drive the panel 2002 to rotate, thus making the panel 2002 rotate relative to the housing 21 and the cleaning brush 300.

In an embodiment, when the panel 2002 is submerged in the water, because the panel 2002 absorbs a lot of water, the total weight of the panel 2002 and the second rod body 20012 increases, which is much greater than the lifting force of the first rod body 20011 acting on the second rod body 20012. Therefore, the first rod body 20011, in the process of driving the second rod body 20012 to rotate, cannot drive the second rod body 20012 to move upwards, which is conducive to the washing and spin-drying of the panel 2002.

In an embodiment, the first rod body 20011 or the second rod body 20012 is configured to be adjustable in length. By adjusting the length of the first rod body 20011 or the second rod body 20012, the total length of the rod body assembly 221 can be adjusted, which is convenient for the user to use the mop 200.

In an embodiment, the length of the first rod body 20011 is adjustable, the first rod body 20011 includes a first portion and a second portion sleeved with each other. By adjusting lengths of the first portion and the second portion, the total length of the first rod body 20011 can be adjusted. In an embodiment, mutually sleeved portions of the first portion and the second portion are threaded to each other.

In an embodiment, when there is water in the bucket body 10, and the moving assembly 22 is at the initial position, the washing principle of the mop 200 is as follows.

When the panel 2002 is connected to the connector 229 at the top of the housing 21, the trigger block 20021 is butted with the connecting rod 225, and applies a downward force to the connecting rod 225. At the initial position, the round rod 2231 is located at a top end of the chute 2241. When the trigger block 20021 drives the connecting rod 225 to move downwards, the round rod 2231 slides in the chute 2241 till to a middle section of the chute 2241, in this case, the fixture block 222 is in contact with the inner wall of the housing 21, which is beneficial to the friction or interaction between the fixture block 222 and the inner wall of the housing 21, making the moving assembly 22 no longer move downward any more. The moving assembly 22 can provide an upward support force for the mop 200. In this case, the first rod body 20011 can be pressed to make the panel 2002 rotate in the bucket body 10 to complete washing.

After the washing is completed, the mop 200 is pulled upwards. Other parts of the moving assembly 22 are driven by the connector 229 and the adjusting rod 221 to move upwards until the fixture block 222 moves to be inserted into the limit hole 212. In this case, the moving assembly 22 is limited, the panel 2002 is higher than the water surface, the first rod body 20011 of the mop 200 is pressed downwards to rotate the panel 2002 for water throwing.

The above is only the specific embodiment of the present disclosure, but the scope of protection of the present disclosure is not limited thereto. Any change or substitution in the technical scope disclosed by the present disclosure should be covered by the scope of protection of the present disclosure.

What is claimed is:

1. A cleaning device, wherein the cleaning device is configured to wash a cleaning tool, comprises a cavity and a lifting assembly arranged in the cavity, and the cavity is used to accommodate water;

the lifting assembly comprises:

a housing, connected to the cavity, and provided with a first accommodating cavity; and a moving assembly, wherein the moving assembly is at least partially arranged in the first accommodating cavity, and configured to move in a first direction relative to the housing;

wherein the moving assembly has an initial position, a first position and a second position relative to the housing, the second position being higher than the first position;

when the moving assembly is at the first position, a panel on the cleaning tool is connected to the moving assembly, a lower surface of the panel is submerged below water surface, and the panel is rotated relative to the cleaning device for cleaning; and the housing is provided with a first through hole which runs through an upper wall of the housing in the first direction and communicates with the first accommodating cavity;

an inner wall of the housing is provided with a first guide groove;

the moving assembly comprises:

an adjusting rod, at least partially located in the first accommodating cavity and movably connected to the housing in the first direction, wherein a top of the adjusting rod is configured to penetrate out of the first through hole;

a fixture block, located in the first accommodating cavity and connected to the adjusting rod, wherein the adjusting rod and the fixture block are configured to move in the first direction, the fixture block is configured to move in a second direction perpendicular to the first direction relative to the adjusting rod, and the fixture block is connected to the housing in a limited manner when the moving assembly is at the second position;

the fixture block or the adjusting rod is at least partially located in the first guide groove, and the fixture block or the adjusting rod is able to move in the first direction under the guidance of the first guide groove;

the moving assembly further comprises:

a round rod, located in the first accommodating cavity, and configured to move in synchronization with the adjusting rod in the first direction;

a first elastic member connected to the adjusting rod and the round rod, and configured to apply an upward thrust to the round rod and the connecting rod;

a special-shaped block, connected to the fixture block and is in adaptive connection with the round rod, wherein the round rod is used to drive the special-shaped block to drive the fixture block to move in the second direction;

a second elastic member, which is connected to the special-shaped block and the fixture block, and configured to apply an outward thrust to the fixture block in the second direction;

a connecting rod, wherein one end of the connecting rod is connected to the round rod, another end of the connecting rod is arranged at the top of the adjusting rod in a penetrating manner, and the connecting rod is configured to drive the round rod to move in the first direction relative to the adjusting rod, or move in synchronization with the adjusting rod; and when the panel is connected to the moving assembly, a trigger block on the panel is pressed against the connecting rod; and the special-shaped block is provided with a chute sized to fit with the round rod, the chute extends along a direction inclined toward the first direction;

the round rod is partially located in the chute, and configured to be movable in the chute to drive the special-shaped block to move in the second direction;

when the moving assembly is at the initial position, the round rod is located at top of the chute, and an end portion of the fixture block is separated from the inner wall of the housing;

when the moving assembly is moving from the initial position to the first position, the round rod moves downwards relative to the adjusting rod, the round rod moves from the top to the middle part of chute driving the fixture block elastically against the inner wall of the housing;

when the moving assembly rises from the first position to the second position, a degree of freedom of the moving assembly in the first direction is limited, the panel is above the water surface, and the panel connected to the moving assembly is rotated relative to the cleaning device for dehydration:

after the moving assembly is in the second position, when the trigger block leaves the connecting rod, the round rod and the connecting rod are driven upwards relative to the adjusting rod by the first elastic, the round rod moves from the bottom to the top part of the chute driving the fixture block out of the limit hole.

2. The cleaning device according to claim 1, wherein the limit hole is provided on the housing, the limit hole is formed in a peripheral wall of the housing and communicates with the first accommodating cavity, and the end portion of the fixture block is sized to fit with the limit hole; and when the moving assembly is at the second position, the end portion of the fixture block is inserted into the limit hole.

3. The cleaning device according to claim 1, wherein an inner side of a sidewall of the housing is provided with a flange which extends from the sidewall of the housing towards an axis of the housing;

when the moving assembly is at the second position, the fixture block is located on the flange and connected to the flange.

4. The cleaning device according to claim 1, wherein the moving assembly further comprises a circular plate; the circular plate is connected to the round rod, and the circular plate and the round rod are configured to move synchronously in the first direction;

the first elastic member is connected to the adjusting rod and the circular plate, and configured to apply an upward thrust to the circular plate, the round rod and the connecting rod.

5. The cleaning device according to claim 1, wherein the adjusting rod is provided with:

a second accommodating cavity, wherein the second accommodating cavity extends in the first direction, and the round rod, part of the connecting rod and part of the special-shaped block are arranged in the second accommodating cavity; and a second guide groove, wherein the second guide groove extend in the second direction and communicates with the second accommodating cavity and the first accommodating cavity, wherein part of the special-shaped block and part of the fixture block are arranged in the second guide groove.

6. The cleaning device according to claim 1, wherein the moving assembly further comprises a bearing, the bearing is located above a top wall of the housing and connected to the adjusting rod;

when the panel is connected to the moving assembly, the bearing is configured to connect the panel and the adjusting rod.

7. The cleaning device according to claim 6, wherein the moving assembly further comprises a connector; the connector is at least partially located above the top wall of the housing, used to connect the adjusting rod and the bearing, and configured to be rotatable relative to the adjusting rod; and when the panel is connected to the moving assembly, the connector is configured to clamp the panel.

8. The cleaning device according to claim 1, wherein the cleaning device further comprises a fixed seat; the fixed seat is fixedly arranged at a bottom wall of the cavity, and the housing is detachably connected to the fixed seat.

9. The cleaning device according to claim 8, wherein the fixed seat is provided with a plurality of stop portions which are arranged at intervals in a circumferential direction of the fixed seat;

a plurality of connecting blocks are arranged at the bottom of the housing, and arranged at intervals in a circumferential direction of the housing;

when the housing is placed on the fixed seat, the connecting blocks are able to be rotated to positions below the stop portions by rotating the housing.

10. The cleaning device according to claim 1, wherein the cleaning device is a movable cleaning bucket; or the cleaning device is an unmovable cleaning sink.

11. The cleaning device according to claim 1, wherein the cleaning device further comprises a cleaning brush, and the cleaning brush is arranged in the cavity;

when the moving assembly is at the first position, and the panel is connected to the moving assembly, and the panel is connected to the cleaning brush and able to rotate relative to the cleaning brush; and when the moving assembly is at the second position, and the panel is connected to the moving assembly, the panel is separated from the cleaning brush.

12. A cleaning module, comprising a cleaning tool, and the cleaning device according to claim 1.

13. The cleaning module according to claim 12, wherein the cleaning tool comprises a rod body assembly and a panel, wherein the rod body assembly comprises a first rod body; the first rod body connected to the panel, and the panel is configured to be rotatable relative to the first rod body.

14. The cleaning module according to claim 12, wherein the cleaning device is a cleaning bucket, the cavity is a bucket body which is configured to be foldable, and a height of the bucket body in a folded state is lower than that of the bucket body in an unfolded state; and the cleaning tool is a mop, and the panel is a mop head.

* * * * *